United States Patent
Yang

(10) Patent No.: US 12,348,395 B2
(45) Date of Patent: Jul. 1, 2025

(54) DATA SAMPLING METHOD FOR A NETWORK DEVICE, DEVICE, AND MEDIUM

(71) Applicant: ZTE CORPORATION, Shenzhen (CN)

(72) Inventor: Mingjie Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 248 days.

(21) Appl. No.: 17/914,670

(22) PCT Filed: Mar. 23, 2021

(86) PCT No.: PCT/CN2021/082475
§ 371 (c)(1),
(2) Date: Sep. 26, 2022

(87) PCT Pub. No.: WO2021/208682
PCT Pub. Date: Oct. 21, 2021

(65) Prior Publication Data
US 2023/0131524 A1    Apr. 27, 2023

(30) Foreign Application Priority Data

Apr. 14, 2020    (CN) .................. 202010289203.2

(51) Int. Cl.
*H04L 43/067*    (2022.01)
*G06F 11/30*    (2006.01)
(Continued)

(52) U.S. Cl.
CPC ........ *H04L 43/067* (2013.01); *G06F 11/3006* (2013.01); *H04L 43/022* (2013.01); *H04L 43/06* (2013.01)

(58) Field of Classification Search
CPC .... H04L 43/022; H04L 43/06; G06F 11/3006; G06F 11/3452
(Continued)

(56) References Cited

U.S. PATENT DOCUMENTS

| 3,821,709 | A |   | 6/1974 | Curley et al. |
| 8,849,993 | B2 | * | 9/2014 | Cooper ............... H04L 63/1425 709/224 |

(Continued)

FOREIGN PATENT DOCUMENTS

| CN | 101951024 A | 1/2011 |
| CN | 101976217 A | 2/2011 |

(Continued)

OTHER PUBLICATIONS

Chinese Search Report for Application No. 2020102892032 dated Apr. 12, 2024, 10 pages including translation.

(Continued)

*Primary Examiner* — Melvin H Pollack
(74) *Attorney, Agent, or Firm* — Morgan, Lewis & Bockius LLP

(57) ABSTRACT

Provided are a data sampling method and apparatus for a network device, a device, and a medium. The data sampling method for a network device includes: configuring, by a central processing unit (CPU), a sampling parameter of target data to a coprocessor; generating, by the coprocessor, a sampling instruction packet at a set frequency according to the sampling parameter, and sending the sampling instruction packet to a network processing unit (NPU); and generating, by the NPU, a sampling reporting packet of the target data according to the sampling instruction packet, and sending the sampling reporting packet to the CPU.

20 Claims, 7 Drawing Sheets

(51) Int. Cl.
  *H04L 43/022* (2022.01)
  *H04L 43/06* (2022.01)
(58) Field of Classification Search
  USPC .......................................................... 370/252
  See application file for complete search history.

(56) References Cited

U.S. PATENT DOCUMENTS

| | | | | |
|---|---|---|---|---|
| 8,923,152 | B2* | 12/2014 | Benko | H04L 43/022 |
| | | | | 370/252 |
| 8,958,318 | B1* | 2/2015 | Hastwell | H04L 63/1408 |
| | | | | 370/252 |
| 9,438,504 | B2* | 9/2016 | Akella | H04L 45/42 |
| 9,979,613 | B2* | 5/2018 | Ladha | H04L 43/04 |
| 10,044,581 | B1* | 8/2018 | Russell | H04L 43/20 |
| 10,108,516 | B2* | 10/2018 | Palmer | G06F 11/3006 |
| 10,356,660 | B2* | 7/2019 | Giraldo Rodriguez | |
| | | | | H04W 28/09 |
| 10,411,983 | B2* | 9/2019 | Mizrahi | H04L 69/22 |
| 10,467,036 | B2 | 11/2019 | Anwar et al. | |
| 10,547,560 | B1* | 1/2020 | Patel | H04L 43/0852 |
| 10,599,548 | B2* | 3/2020 | Wang | G06F 11/3037 |
| 10,644,947 | B2* | 5/2020 | Goel | G06F 11/0793 |
| 10,721,134 | B2* | 7/2020 | Papaloukopoulos | H04L 43/18 |
| 10,785,278 | B2* | 9/2020 | Shakir | H04L 43/18 |
| 10,855,604 | B2* | 12/2020 | Tigli | H04L 47/2408 |
| 11,044,180 | B2* | 6/2021 | Rastogi | G06F 11/3082 |
| 11,109,389 | B2* | 8/2021 | Jia | H04W 24/10 |
| 11,240,696 | B2* | 2/2022 | Balasubramanian | H04L 43/50 |
| 11,328,222 | B1* | 5/2022 | Matthews | H04L 47/2441 |
| 11,388,074 | B2* | 7/2022 | McCarthy | G06F 1/3209 |
| 11,435,937 | B2* | 9/2022 | Esposito | G06F 3/0653 |
| 11,443,166 | B2* | 9/2022 | Shinde | G06N 3/045 |
| 11,533,263 | B2* | 12/2022 | Li | H04L 45/566 |
| 11,533,326 | B2* | 12/2022 | Salunke | G06N 20/10 |
| 11,561,767 | B2* | 1/2023 | Gope | G06N 3/084 |
| 11,620,528 | B2* | 4/2023 | Ryan | G06N 3/045 |
| | | | | 709/224 |
| 11,696,155 | B2* | 7/2023 | Cioffi | H04W 28/16 |
| | | | | 455/446 |
| 11,710,492 | B2* | 7/2023 | Villette | G10L 19/16 |
| | | | | 704/500 |
| 11,729,116 | B2* | 8/2023 | Subbiah | H04L 63/1408 |
| | | | | 370/235 |
| 11,855,967 | B2* | 12/2023 | Li | H04W 28/10 |
| 11,921,499 | B2* | 3/2024 | Niu | G05B 23/0221 |
| 2016/0020968 | A1* | 1/2016 | Aumann | H04L 43/12 |
| | | | | 370/252 |
| 2016/0088001 | A1* | 3/2016 | Yeh | H04L 63/20 |
| | | | | 726/23 |
| 2016/0105333 | A1* | 4/2016 | Lenglet | H04L 43/20 |
| | | | | 370/252 |
| 2018/0278500 | A1* | 9/2018 | Feamster | H04L 43/20 |
| 2019/0087712 | A1 | 3/2019 | Sundaresan et al. | |
| 2021/0012459 | A1 | 1/2021 | Chen et al. | |
| 2021/0243649 | A1* | 8/2021 | Wikström | H04L 43/022 |
| 2021/0336960 | A1* | 10/2021 | Sandler | H04L 41/0894 |

FOREIGN PATENT DOCUMENTS

| | | |
|---|---|---|
| CN | 102346455 A | 2/2012 |
| CN | 102546399 A | 7/2012 |
| CN | 103200048 A | 7/2013 |
| CN | 103368777 A | 10/2013 |
| CN | 104202209 A | 12/2014 |
| CN | 204462752 U | 7/2015 |
| CN | 104915181 A | 9/2015 |
| CN | 105610633 A | 5/2016 |
| CN | 105763480 A | 7/2016 |
| CN | 106970300 A | 7/2017 |
| CN | 108429657 A | 8/2018 |
| CN | 109474362 A | 3/2019 |
| CN | 109861981 A | 6/2019 |
| CN | 110266726 A | 9/2019 |
| WO | WO2016/122708 A1 | 8/2016 |
| WO | WO2016/192138 A1 | 12/2016 |

OTHER PUBLICATIONS

Extended European Search Report of Application No. 21788665.4 dated Mar. 19, 2024, 13 pages.

Xiong Li, "Application of substation integrated automation in industrial enterprises", Electromechanical Information, No. 18, Jun. 25, 2011, pp. 39-40.

International Search Report in Application No. PCT/CN2021/082475, dated Jun. 28, 2021, 4 pages including English Translation.

* cited by examiner

DATA SAMPLING METHOD FOR A NETWORK DEVICE, DEVICE, AND MEDIUM

CROSS REFERENCES TO RELATED APPLICATIONS

This application is a national stage application filed under 35 U.S.C. 371 based on International Patent Application No. PCT/CN2021/082475, filed on Mar. 23, 2021, which claims priority to Chinese Patent Application No. 202010289203.2 filed with the CNIPA on Apr. 14, 2020, disclosures of which are incorporated herein by reference in their entireties.

TECHNICAL FIELD

The present application relates to the field of communications, for example, a data sampling method and apparatus for a network device, a device, and a medium.

BACKGROUND

With the advent of the era of the 5th generation mobile communication systems (5G) and the rise of the management interfaces configured by operators, the data flow increases exponentially, and the traffic carried by a network gradually tends to be diversified, putting forward higher requirements for the maintainability and monitoring performance of the telecommunication transmission device. The statistical sampling of the performance, alarm and state of the network device reaches up to 100 times per second.

The conventional statistical sampling method of packets is: when a packet passes through a network device, the network processing unit (NPU) of the network device performs packet statistics, the NPU stores a plurality of statistic values in the memory of the NPU, and then the central processing unit (CPU) of the device regularly sends query messages to the NPU, regularly samples the acquired statistic values (as shown in FIG. 1), processes the statistic values and presents the processed statistic values to a human-machine interface. However, when there are too many query items, the CPU needs to process multiple query messages so that the processing resources of the CPU and the configured query channel bandwidth between the CPU and the NPU are seriously consumed. For the sampling requirements of 10 ms to 100 ms, the CPU fails to process so many messages in a short time. Even if the high-performance CPU can process so many messages, a lot of processing resources of the high-performance CPU are consumed, and the price of the high-performance CPU is very high.

SUMMARY

The present application provides a data sampling method and apparatus for a network device, a device, and a medium, so as to greatly reduce the occupied CPU processing resources on the premise of satisfying the requirements of the high data sampling rate of the network device.

A data sampling method for a network device is provided. The method is applied by the network device and includes the following.

A CPU configures a sampling parameter of target data to a coprocessor; the coprocessor generates a sampling instruction packet at a set frequency according to the sampling parameter and sends the sampling instruction packet to an NPU; and the NPU generates a sampling reporting packet of the target data according to the sampling instruction packet and sends the sampling reporting packet to the CPU.

A data sampling method for a network device is further provided. The method is applied by a CPU and includes the following.

A sampling parameter of target data is configured to a coprocessor, where the sampling parameter is used for the coprocessor to generate a sampling instruction packet at a set frequency and send the sampling instruction packet to an NPU, and the sampling instruction packet is used for the NPU to generate a sampling reporting packet of the target data and send the sampling reporting packet to the CPU; and the sampling reporting packet of the target data sent by the NPU is received.

A data sampling method for a network device is further provided. The method is applied by a coprocessor and includes the following.

A sampling parameter of target data configured by a CPU is read; and a sampling instruction packet is generated at a set frequency according to the sampling parameter and sent to an NPU, where the sampling instruction packet is used for the NPU to generate a sampling reporting packet of the target data and send the sampling reporting packet to the CPU.

A data sampling method for a network device is further provided. The method is applied by an NPU and includes the following.

A sampling instruction packet sent by a coprocessor is received, where the sampling instruction packet is generated by the coprocessor at a set frequency according to a sampling parameter of target data sent by a CPU; and a sampling reporting packet of the target data is generated according to the sampling instruction packet, and the sampling reporting packet is sent to the CPU.

A data sampling apparatus for a network device is further provided. The apparatus is applied to a CPU and includes a sampling parameter configuration module and a sampling reporting packet receiving module.

The sampling parameter configuration module is configured to configure a sampling parameter of target data to a coprocessor, where the sampling parameter is used for the coprocessor to generate a sampling instruction packet at a set frequency and send the sampling instruction packet to an NPU, and the sampling instruction packet is used for the NPU to generate a sampling reporting packet of the target data and send the sampling reporting packet to the CPU. The sampling reporting packet receiving module is configured to receive the sampling reporting packet of the target data sent by the NPU.

A data sampling apparatus for a network device is further provided. The apparatus is applied by a coprocessor and includes a sampling parameter reading module and a sampling instruction packet sending module.

The sampling parameter reading module is configured to read a sampling parameter of target data configured by a CPU. The sampling instruction packet sending module is configured to generate a sampling instruction packet at a set frequency according to the sampling parameter and send the sampling instruction packet to an NPU, where the sampling instruction packet is used for the NPU to generate a sampling reporting packet of the target data and send the sampling reporting packet to the CPU.

A data sampling apparatus for a network device is further provided. The apparatus is applied to an NPU and includes a sampling instruction packet receiving module and a sampling reporting packet sending module.

The sampling instruction packet receiving module is configured to receive a sampling instruction packet sent by a coprocessor, where the sampling instruction packet is generated by the coprocessor at a set frequency according to a sampling parameter of target data sent by a CPU. The sampling reporting packet sending module is configured to generate a sampling reporting packet of the target data according to the sampling instruction packet and send the sampling reporting packet to the CPU.

A CPU is further provided. The CPU includes one or more processing units and a storage unit which is configured to store one or more programs, where the one or more programs, when executed by the one or more processing units, enable the one or more processing units to perform the data sampling method for a network device applied by the CPU.

A coprocessor is further provided. The coprocessor includes one or more processing units and a storage unit which is configured to store one or more programs, where the one or more programs, when executed by the one or more processing units, enable the one or more processing units to perform the data sampling method for a network device applied by the coprocessor.

An NPU is further provided. The NPU includes one or more processing units and a storage unit which is configured to store one or more programs, where the one or more programs, when executed by the one or more processing units, enable the one or more processing units to perform the data sampling method for a network device applied by the NPU.

A network device is further provided. The network device includes a CPU, a coprocessor, and an NPU. The CPU is configured to perform the data sampling method for a network device applied by the CPU, the coprocessor is configured to perform the data sampling method for a network device applied by the coprocessor, and the NPU is configured to perform the data sampling method for a network device applied by the NPU.

A storage medium is further provided. The storage medium is configured to store a computer program, where the computer program, when executed by a processor, implements the data sampling method for a network device described above.

DETAILED DESCRIPTION

Embodiments of the present application are described below in conjunction with drawings.

Figure 1:
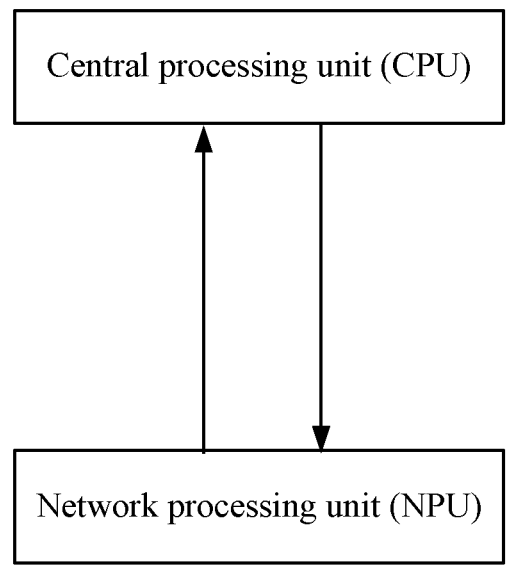
FIG. 1 is a schematic diagram of the module structure of a conventional network device.
Figure 2:
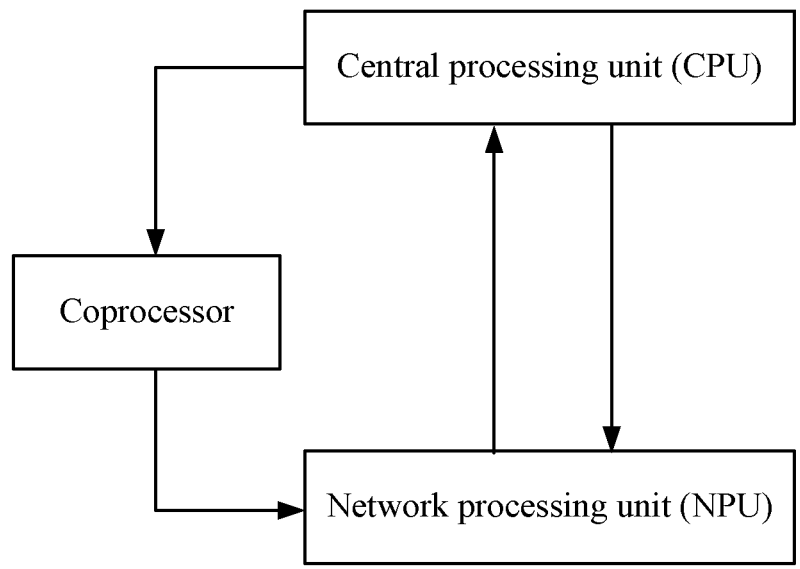
FIG. 2 is a schematic diagram of the module structure of a network device according to an embodiment of the present application.

As shown in FIG. 2, the network device provided by the present application includes a CPU, a coprocessor, and an NPU.

The CPU is configured to process a user configuration and process and present a sampling result and plays an overall control role in the system. The NPU is the core device of the network device, has a certain programming capability and can process network packets at high speed. In the present application, after the NPU receives packets from the network, the NPU performs various statistics on the packets. The coprocessor may be an external field-programmable gate array (FPGA) or a packet generator in the NPU and has simple computing and processing capability and fast packet forwarding capability.

The CPU configures a sampling parameter of target data to the coprocessor, the coprocessor receives the sampling parameter, generates a sampling instruction packet at a set frequency according to the sampling parameter and sends the sampling instruction packet to the NPU, and the NPU generates a sampling reporting packet of the target data according to the sampling instruction packet and sends the sampling reporting packet to the CPU so that the CPU receives the sampling reporting packet and processes the sampling result carried in the sampling reporting packet.

Figure 3:
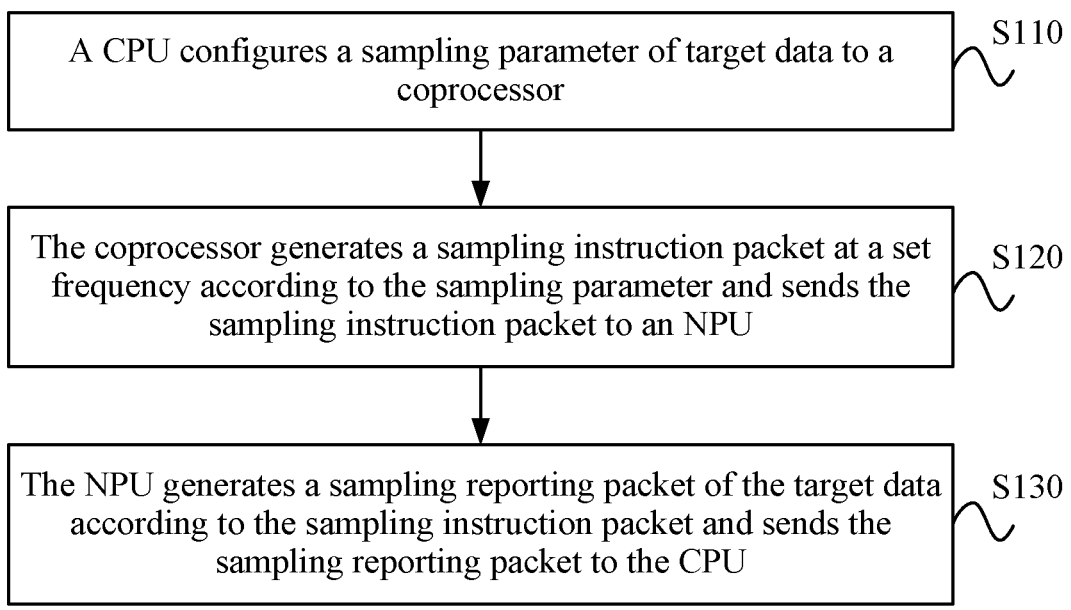
FIG. 3 is a flowchart of a data sampling method for a network device according to an embodiment of the present application.

In an example embodiment, FIG. 3 is a flowchart of a data sampling method for a network device according to an embodiment of the present application. This method is suitable for the case where sampling is performed, at a high frequency, on the traffic (or performance) statistics, real-time alarms, real-time states and the like processed by the network device. This method may be performed by a data sampling apparatus provided by the present application, where the apparatus is applied in a network device. The data sampling apparatus for a network device may be implemented by software and/or hardware and integrated into the network device.

As shown in FIG. 3, the data sampling method for a network device provided by the present application is applied by a network device and includes S110, S120, and S130.

In S110, a CPU configures a sampling parameter of target data to a coprocessor.

The target data refers to the data obtained by sampling the network device, such as traffic statistic data, real-time alarm data, and real-time state data which are processed by the device. The data sampling method provided by this embodiment relates to the statistics of network device port packet sending and receiving, multi-level traffic, an access-control list (ACL) and the like, as well as the sampling of various alarms and various states.

Firstly, a user configuration parameter is preset to the CPU. The CPU obtains a sampling parameter after processing the user configuration parameter, and configures the sampling parameter to the coprocessor. Optionally, the coprocessor is an external FPGA or a packet generator in the NPU and is not limited to this embodiment, and any apparatus having simple computing processing capability and fast packet generation capability in the network device may be used as the coprocessor.

The user configuration parameter may be a sampling function item, a sampling frequency, a reporting frequency, and the like. The reporting frequency may be a sample value reporting frequency and/or an average value reporting frequency. The user configuration parameter may also include whether to suppress redundancy.

In an example, the average value may refer to the average value of all sampling values in a period.

In another example, the average value may refer to the average of a maximum sampling value in a period and a minimum sampling value in a period, that is, a maximum-minimum average value.

In an example, the sampling parameter at least includes a sampling number, a sampling function item, a sampling frequency, and a reporting interval.

The sampling number is used for uniquely identifying a sampling task. The sampling function item is used for identifying the name of the sampling task, such as traffic statistics 1, traffic statistics 2, alarm 1, alarm 2, state 1, state 2, and the like. The sampling frequency is a parameter set by the user and defines the amount of data taken out of continuous data every second, also called the sampling rate. The reporting interval defines the number of times of sampling every which reporting is performed once.

The sampling value reporting interval is determined according to the reporting frequency and the sampling frequency, where the reporting frequency is a parameter set by the user and defines the number of times of data reporting per second. For example, the reporting interval is equal to the sampling frequency divided by the reporting frequency. For example, if the reporting frequency is 10 times per second and the sampling frequency is 100 times per second, the reporting interval is 10, that is, reporting is performed once every ten times of sampling. In an embodiment, the sampling frequency is an integer multiple of the reporting frequency.

The reporting interval includes a sampling value reporting interval and/or an average value reporting interval. The sampling value reporting interval defines the number of times of sampling every which the data sampling value is reported once, and the average value reporting interval defines the number of times of sampling every which the data average value is reported once.

The sampling value reporting interval is determined according to the sampling value reporting frequency and the sampling frequency, where the sampling value reporting frequency is a parameter set by the user and defines the number of times of data sampling value reporting per second, for example, the sampling value reporting interval is equal to the sampling frequency divided by the sampling value reporting frequency.

The average value reporting interval is determined according to the average value reporting frequency and the sampling frequency, where the average value reporting frequency is a parameter set by the user and defines the number of times of data average value reporting per second, for example, the average value reporting interval is equal to the sampling frequency divided by the average value reporting frequency.

After the user configuration parameter is preset to the CPU, the CPU calculates the reporting interval according to the sampling frequency and the reporting frequency.

In another example, the sampling parameter at least includes a sampling number, a sampling function item, a sampling frequency, a reporting interval, and a redundancy suppression identity.

The redundancy suppression identity is a parameter set by the user and is used for identifying whether a redundancy suppression function is required in the sampling process. The redundancy suppression identity is a valid value and corresponds to that the redundancy suppression function is required in the sampling process.

The CPU configures at least one group of sampling parameters to the coprocessor. That is, the CPU may configure corresponding sampling parameters to the coprocessor for a plurality of sampling function items.

In S102, the coprocessor generates a sampling instruction packet at a set frequency according to the sampling parameter and sends the sampling instruction packet to an NPU.

After the coprocessor reads the sampling parameter configured by the CPU, the coprocessor generates the sampling instruction packet at the set frequency according to the sampling parameter and sends the sampling instruction packet to the NPU. The set frequency may be any preset frequency, for example, the operating frequency of the coprocessor.

In an example, the coprocessor may generate the sampling instruction packet at the set frequency according to the sampling parameter in the following manner: for a sampling function item whose sampling frequency is not zero, the coprocessor generates a sampling instruction packet at the sampling frequency according to the sampling parameter.

The set frequency may be the sampling frequency in the sampling parameter. That is, the coprocessor generates the sampling instruction packet at the sampling frequency and sends the sampling instruction packet to the NPU so that the NPU acquires a corresponding sampling value according to the sampling instruction packet.

In an example, the coprocessor may maintain a logical table inside the coprocessor itself, and the logical table may be called the sampling parameter configuration table herein and is used for describing the sampling function items that currently need to be performed and corresponding parameters. The fast sampling parameter configuration table is a logical table which can be accessed by the coprocessor and may be configured by the CPU, that is, the CPU may configure the sampling parameter into the sampling parameter configuration table, so as to control the coprocessor to send the sampling instruction packet based on the sampling parameters in the sampling parameter configuration table. In an embodiment, the fast sampling parameter configuration table may be as shown in Table 1.

In an example, the sampling instruction packet carries a packet type, a sampling number, a sampling function item, a reporting count value, and a reporting interval.

In the present application, the packet type carried in the sampling instruction packet is a sampling type.

The reporting count value refers to the number of sampling instruction packets sent for the current reporting and ranges from an initial value to the reporting interval. The reporting count value starts from an initial value (for example, 1). If the reporting count value is not equal to the reporting interval, the reporting count value in the next sampling instruction packet sent by the coprocessor is increased by 1, and if the reporting count value is equal to the reporting interval, the reporting count value in the next sampling instruction packet sent by the coprocessor is reset to the initial value (that is, 1).

TABLE 1

| Sampling number | Sampling function item | Sampling frequency | Sampling value reporting interval | Average value reporting interval | Redundancy suppression identity |
|---|---|---|---|---|---|
| Number 1 | Statistical item 1 | | | | |
| Number 2 | Statistical item 3 | | | | |
| Number 3 | Statistical item 4 | | | | |
| Number 4 | Performance item 1 | | | | |
| Number 5 | State item 1 | | | | |
| . . . | . . . | | | | |
| . . . | . . . | | | | |

When the reporting interval is the sampling value reporting interval, the reporting count value is a sampling value reporting count value, and in sampling instruction packets sent sequentially, the sampling value reporting count value is sequentially increased from an initial value and reset to the initial value when the sampling value reporting count value is increased to the sampling value reporting interval.

The sampling value reporting count value starts from an initial value (for example, 1). If the sampling value reporting count value is not equal to the sampling value reporting interval, the sampling value reporting count value in the next sampling instruction packet sent by the coprocessor is increased by 1, and if the sampling value reporting count value is equal to the sampling value reporting interval, the sampling value reporting count value in the next sampling instruction packet sent by the coprocessor is reset to the initial value (that is, 1).

When the reporting interval is the average value reporting interval, the reporting count value is an average value reporting count value, and for sampling function items whose average value reporting interval is not zero, in sampling instruction packets sent sequentially, the average value reporting count value is sequentially increased from an initial value and reset to the initial value when the average value reporting count value is increased to the average value reporting interval.

If the average value reporting interval corresponding to the sampling function item is not 0 (the average reporting interval of 0 means that no average value reporting needs to be performed), the average value reporting count value in the sampling instruction packet starts from an initial value (for example, 1). If the average value reporting count value is not equal to the average value reporting interval, the average value reporting count value in the next sampling instruction packet sent by the coprocessor is increased by 1, and if the average value reporting count value is equal to the average value reporting interval, the average value reporting count value in the next sampling instruction packet sent by the coprocessor is reset to the initial value (that is, 1).

The significance of setting the reporting count value is that since the NPU does not have the timing count function and does not know when to send the sampling reporting packet to the CPU, by the reporting count value set in the sampling instruction packet, the NPU can determine whether to send the sampling reporting packet to the CPU by comparing the reporting count value in the sampling instruction packet with the reporting interval.

In another example, the sampling instruction packet carries a packet type, a sampling number, a sampling function item, a reporting count value, a reporting interval, and a redundancy suppression identity.

The redundancy suppression identity is used for indicating that the NPU achieves the redundancy suppression function when the redundancy suppression identity is a valid value. When the NPU achieves the redundancy suppression function, if the current sampling data changes, the NPU reports to the CPU immediately, and if the current sampling data does not change, the NPU reports to the CPU according to the reporting interval.

In an example, the sampling instruction packet further includes a sampling function item total number. The sampling function item total number is used for indicating the number of groups of sampling numbers and sampling function items included in the sampling instruction packet, and sampling function items in different groups have the same sampling frequency and the same reporting interval.

If a plurality of sampling function items is associated and has the same sampling frequency and reporting frequency, the plurality of sampling function items may be configured simultaneously. Further, the coprocessor may carry a plurality of sampling function items in one sampling instruction packet, and the sampling function item total number is carried in the sampling instruction packet.

The number of groups of sampling numbers and sampling function items included in the sampling instruction packet is at least one. When the sampling instruction packet carries only one sampling function item, the sampling function item total number is 1.

In a specific example, the field information included in the sampling instruction packet is shown in Table 2.

TABLE 2

| Packet type (sampling) | Sampling value reporting interval | Sampling value reporting count value | Average value reporting interval | Average value reporting count value | Redundancy suppression identity | Sampling function item total number | Sampling number (Number 1) | Sampling function item (Statistical item 1) | Sampling number (Number 2) | Sampling function item (Performance item 1) | . . . . . . |
|---|---|---|---|---|---|---|---|---|---|---|---|

In S130, the NPU generates a sampling reporting packet of the target data according to the sampling instruction packet and sends the sampling reporting packet to the CPU.

The NPU is the core device of the network device, has a certain programming capability and can process network packets at high speed. In the present application, after the NPU receives the packets sent from the coprocessor, the NPU performs statistical analysis on various packets.

The NPU has a plurality of statistical registers, alarm registers and state registers inside the NPU itself, these registers correspond to different statistical function items, alarm items and status items, respectively, for indicating the statistic, alarm and state of the current network and device.

In addition, NPU can access, read and write a piece of memory space that may be called the sampling memory space, and the sampling memory space is configured to store sampling values. In a specific example, a sampling value storage table of the sampling memory space is shown in Table 3, where the average value may be a maximum-minimum average value. The following is described by using an example where the average value is the maximum-minimum average value, that is, the average value mentioned below may be the maximum-minimum average value.

TABLE 3

| Sampling number | Sampling function item | Sampling value reporting interval | Redundancy suppression identity | Average value reporting interval | Sampling minimum value in a period | Sampling maximum value in a period | Sampling value 1 | Sampling value 2 | ... | Sampling value x |
|---|---|---|---|---|---|---|---|---|---|---|
| Number 1 | Statistical item 1 | | | | | | | | | |
| Number 2 | Statistical item 3 | | | | | | | | | |
| Number 3 | Statistical item 4 | | | | | | | | | |
| Number 4 | Performance item 1 | | | | | | | | | |
| Number 5 | State item 1 | | | | | | | | | |
| ... | ... | | | | | | | | | |
| ... | ... | | | | | | | | | |

In an example, the NPU may generate the sampling reporting packet of the target data according to the sampling instruction packet in the following manner.

The NPU updates a locally stored sampling value according to the sampling instruction packet, and when the reporting count value in the sampling instruction packet is equal to the reporting interval, the NPU generates the sampling reporting packet of the target data according to the updated locally stored sampling value, where the sampling reporting packet includes a sampling value reporting packet and/or an average value reporting packet.

The NPU moves a sampling value in a corresponding register into the sampling memory space based on a sequence according to a field in the received sampling instruction packet, the sampling value may be added to the sampling value storage table as shown in Table 3, and the sampling values in the sampling value storage table are used for filling the sampling reporting packet.

In order to calculate the data average value in a period, after the NPU moves the sampling value in the corresponding register into the sampling memory space based on the sequence according to the field in the received sampling instruction packet, the NPU may update the maximum value in the period and the minimum value in the period both of which are matched with the sampling number. Further, when the average value needs to be reported, the average value may be calculated directly according to the maximum value in the period and the minimum value in the period both of which are matched with the sampling number in the sampling value storage table shown in Table 3. The average value is the average value of the maximum value in the period and the minimum value in the period.

Meanwhile, the NPU determines whether the sending period of the sampling reporting packet has been reached by comparing the reporting interval and the reporting count value in the sampling instruction packet.

If the sampling value reporting count value and the sampling value reporting interval in the sampling instruction packet are not equal, the sending period of the sampling reporting packet of the sampling value has not been reached. If the sampling value reporting count value and the sampling value reporting interval in the sampling instruction packet are equal, the sending period the sampling reporting packet of the sampling value has been reached, and then the NPU generates the corresponding sampling reporting packet and sends the sampling reporting packet to the CPU.

If the average value reporting interval in the sampling instruction packet is zero, the average value does not need to be reported. If the average value reporting interval in the sampling instruction packet is not zero, the average value needs to be reported. If the average value reporting count value and the average value reporting interval in the sampling instruction packet are not equal, the sending period of the sampling reporting packet of the average value has not been reached. If the average value reporting count value and the average value reporting interval in the sampling instruction packet are equal, the sending period of the sampling reporting packet of the average value has been reached, and then the NPU generates the corresponding sampling reporting packet and sends the sampling reporting packet to the CPU.

In another example, the NPU may generate the sampling reporting packet of the target data according to the sampling instruction packet in the following manner.

When the redundancy suppression identity in the sampling instruction packet is a valid value, the NPU updates a locally stored sampling value according to the sampling instruction packet and determines whether the sampling value at a current time instant changes. If it is determined that the sampling value at the current time instant changes, the NPU generates the sampling reporting packet of the target data according to the updated locally stored sampling value. If it is determined that the sampling value at the current time instant does not change, when the reporting count value in the sampling instruction packet is equal to the reporting interval, the NPU generates the sampling reporting packet of the target data according to the updated locally stored sampling value and sends the sampling reporting packet to the CPU; where the sampling reporting packet includes a sampling value reporting packet and/or an average value reporting packet.

When the redundancy suppression identity in the sampling instruction packet is a valid value, the NPU updates a locally stored sampling value according to the sampling instruction packet and determines whether the sampling value at a current time instant changes. If the sampling value at the current time instant changes, the NPU generates the sampling reporting packet of the target data according to the locally stored sampling value and sends the sampling reporting packet to the CPU. If the sampling value at the current time instant does not change, when the reporting count value in the sampling instruction packet is equal to the reporting interval, the NPU generates the sampling reporting packet of the target data according to the locally stored sampling value and sends the sampling reporting packet to the CPU.

When whether the sampling value at the current time instant changes is determined, for the statistical value, if the sampling value at the current time instant is not zero, the sampling value at the current time instant is considered to have changed; for the alarm value and the state value, if the sampling value at the current time instant is inconsistent with the sampling value at a previous time instant, the sampling value at the current time instant is considered to have changed. Further, when the suppression redundancy identity is a valid value, if the sampling value at the current time instant changes, the NPU immediately sends the sampling reporting packet to the CPU, and if the sampling value at the current time instant does not change, the NPU sends the sampling reporting packet to the CPU only when the reporting period is reached.

In a specific example, the field information included in the sampling reporting packet of the sampling value is shown in Table 4.

processing resources, and saving the message channel bandwidth between the CPU and the NPU, thereby improving the statistical monitoring performance of the whole network data and providing a guarantee for the reliability of the telecommunication traffic.

In a specific example, taking sampling value reporting as an example, the maximum-minimum average value reporting is not required, and the redundancy suppression function is not required. The user parameter is preset to the CPU, the average value reporting interval is set to 0, and the redundancy suppression identity is set to a non-true value.

The CPU calculates the sampling value reporting interval, where the sampling value reporting interval is equal to the sampling frequency divided by the sampling value reporting frequency. The CPU calculates and acquires an unoccupied sampling number and configures a sampling parameter to the coprocessor, where the sampling parameter includes a sampling number, a sampling frequency, a sampling function item, a sampling value reporting interval, an average value reporting interval, a redundancy suppression identity, and the like.

For a sampling function item whose sampling frequency is not 0, the coprocessor generates, at a configured sampling frequency according to the sampling parameter configured by the CPU, one sampling instruction packet carrying a sampling number, a sampling function item, a sampling value reporting count value, a sampling value reporting interval, an average value reporting count value, an average

TABLE 4

| Packet type (sampling value reporting packet) | Sampling value reporting interval | Sampling function item total number | Sampling number (Number 1) | Sampling function item (Statistical item 1) | Sampling value 1 | Sampling value 2 | Sampling value 3 | ... |
|---|---|---|---|---|---|---|---|---|
| ... | Sampling value n | Sampling number (Number 4) | Sampling function item (Performance item 1) | Sampling value 1 | Sampling value 2 | Sampling value 3 | ... | ... |
| Sampling value n | ... | ... | | | | | | |

In a specific example, the field information included in the sampling reporting packet related to the average value is shown in Table 5.

value reporting interval and a redundancy suppression identity and sends the sampling instruction packet to the NPU.

TABLE 5

| Packet type (average value reporting packet) | Average value reporting interval | Sampling function item total number | Sampling number (Number 1) | Sampling function item (Statistical item 1) | Maximum-minimum average value | Sampling number (Number 4) | Sampling function item (Performance item 1) | Maximum-minimum average value | ...... |
|---|---|---|---|---|---|---|---|---|---|

The CPU analyzes the sampling reporting packet sent by the NPU, acquires the sampling value carried in the sampling reporting packet, performs setting processing on the sampling value and presents the sampling value to the human-machine interface.

Compared with the conventional CPU active sampling mode, in the solution provided by this embodiment, a higher sampling frequency can be achieved (the statistical data can be sampled at a frequency faster than 100 times per second at most), avoiding consuming a large number of CPU The sampling value reporting count value may start from 1. Every time one sampling instruction packet is sent, if the sampling value reporting count value corresponding to the sampling function item is not equal to the corresponding sampling value reporting interval, the sampling value reporting count value corresponding to the sampling function item in the sampling instruction packet next sent is increased by 1, and if the sampling value reporting count value corresponding to the sampling function item is equal to the corresponding sampling value reporting interval, the sampling value reporting count value corresponding to the sampling function item in the sampling indication packet next sent is set to 1.

The average value reporting interval corresponding to the sampling function item is 0, and the average value reporting count value in the sampling instruction packet may be null or other values, which is not limited herein.

If a plurality of sampling function items are associated and have the same sampling frequency and reporting frequency, the plurality of sampling function items may be configured simultaneously, the plurality of sampling function items may be carried in the sampling instruction packet simultaneously, and the sampling function item total number field is carried in the sampling instruction packet.

After the NPU receives the sampling instruction packet, the NPU identifies the sampling function item in the sampling instruction packet and reads the corresponding statistics value, alarm value and status value.

When the NPU determines that the redundancy suppression identity is a non-true value, the NPU moves a sampling value to a matched sampling value sequence according to the sampling instruction packet and updates the maximum value in the period and the minimum value in the period. The NPU determines that the maximum-minimum average value does not need to be reported according to the fact that the average value reporting interval in the sampling instruction packet is zero. The NPU determines whether the sampling value reporting count value and the sampling value reporting interval in the sampling instruction packet are equal. If the sampling value reporting count value and the sampling value reporting interval are not equal, that means the sending period of the sampling value reporting packet has not been reached, the NPU ends the processing. If the sampling value reporting count value and the sampling value reporting interval are equal, that means the sending period of the sampling value reporting packet has been reached, the NPU generates one sampling value reporting packet, fills the fields including a sampling number, a sampling value and other information in the sampling value reporting packet, sends the sampling value reporting packet to the CPU, and ends the processing.

In another specific example, taking sampling value reporting as an example, the maximum-minimum average value reporting is required, but the redundancy suppression function is not required. The user parameter is preset to the CPU, and the redundancy suppression identity is set to a non-true value.

On the basis of the examples described above, the CPU also calculates the average value reporting interval, where the average value reporting interval is equal to the sampling frequency divided by the average value reporting frequency.

The CPU calculates and acquires an unoccupied sampling number and configures a sampling parameter to the coprocessor, where the sampling parameter includes a sampling number, a sampling frequency, a sampling function item, a sampling value reporting interval, an average value reporting interval, a redundancy suppression identity, and the like.

For a sampling function item whose sampling frequency is not 0, the coprocessor generates at a configured sampling frequency according to the sampling parameter configured by the CPU one sampling instruction packet carrying a sampling number, a sampling function item, a sampling value reporting count value, a sampling value reporting interval, an average value reporting count value, an average value reporting interval and a redundancy suppression identity and sends the sampling instruction packet to the NPU.

The sampling value reporting count value may start from 1. Every time one sampling instruction packet is sent, if the sampling value reporting count value corresponding to the sampling function item is not equal to the corresponding sampling value reporting interval, the sampling value reporting count value corresponding to the sampling function item in the sampling instruction packet next sent is increased by 1, and if the sampling value reporting count value corresponding to the sampling function item is equal to the corresponding sampling value reporting interval, the sampling value reporting count value corresponding to the sampling function item in the sampling indication packet next sent is set to 1.

If the average value reporting interval corresponding to the sampling function item is not 0, the average value reporting count value in the sampling instruction packet starts from 1. Every time one sampling instruction packet is sent, if the average value reporting count value corresponding to the sampling function item is not equal to the corresponding average value reporting interval, the average value reporting count value corresponding to the sampling function item in the sampling instruction packet next sent is increased by 1, and if the average value reporting count value corresponding to the sampling function item is equal to the corresponding average value reporting interval, the average value reporting count value corresponding to the sampling function item in the sampling indication packet next sent is set to 1.

If a plurality of sampling function items is associated and has the same sampling frequency and reporting frequency, the plurality of sampling function items may be configured simultaneously, the plurality of sampling function items may be carried in the sampling instruction packet simultaneously, and the sampling function item total number field is carried in the sampling instruction packet.

After the NPU receives the sampling instruction packet, the NPU identifies the sampling function item in the sampling instruction packet and reads the corresponding statistics value, alarm value and status value.

When the NPU determines that the redundancy suppression identity is a non-true value, the NPU moves a sampling value to a matched sampling value sequence according to the sampling instruction packet and updates the maximum value in the period and the minimum value in the period. The NPU determines that the maximum-minimum average value needs to be reported according to the fact that the average value reporting interval in the sampling instruction packet is not zero. The NPU determines whether the average value reporting count value and the average value reporting interval in the sampling instruction packet are equal. If the average value reporting count value and the average value reporting interval are not equal, the sending period of the average value reporting packet has not been reached. If the average value reporting count value and the average value reporting interval are equal, meaning that the sending period of the average value reporting packet has been reached, the NUP generates one average value reporting packet, fills the fields including a sampling number, an average value and other information in the average value reporting packet, sends the average value reporting packet to the CPU, and empties the corresponding maximum value in the period and minimum value in the period in the storage space. The NPU determines whether the sampling value reporting count value and the sampling value reporting interval in the sampling instruction packet are equal. If the sampling value reporting count value and the sampling value reporting interval are not equal, meaning that the sending period of the sampling value reporting packet has not been reached, the NPU ends the processing. If the sampling value reporting count value and the sampling value reporting interval are equal, meaning that the sending period of the sampling value reporting packet has been reached, the NUP generates one sampling value reporting packet, fills the fields including a sampling number, a sampling value and other information in the sampling value reporting packet, sends the sampling value reporting packet to the CPU, and ends the processing.

In another specific example, taking sampling value reporting as an example, the redundancy suppression function is also required. The user parameter is preset to the CPU, and the redundancy suppression identity is set to a true value.

After the NPU receives the sampling instruction packet, the NPU identifies the sampling function item in the sampling instruction packet and reads the corresponding statistics value, alarm value and status value.

When the NPU determines that the redundancy suppression identity is a true value, the NPU moves a sampling value to a matched sampling value sequence according to the sampling instruction packet and updates the maximum value in the period and the minimum value in the period. Whether the sampling value at the current time instant changes is determined. For the statistical value, if the sampling value at the current time instant is not zero, the sampling value at the current time instant is considered to have changed; for the alarm value and the state value, if the sampling value at the current time instant is inconsistent with the sampling value at a previous time instant, the sampling value at the current time instant is considered to have changed.

If the sampling value at the current time instant changes, the NPU generates one sampling value reporting packet, fills the fields including a sampling number, a sampling value and other information in the sampling value reporting packet, sends the sampling value reporting packet to the CPU, and ends the processing. If the sampling value at the current time instant does not change, the NPU determines whether the sampling value reporting count value and the sampling value reporting interval in the sampling instruction packet are equal. If the sampling value reporting count value and the sampling value reporting interval are not equal, meaning that the sending period of the sampling value reporting packet has not been reached, the NPU ends the processing. If the sampling value reporting count value and the sampling value reporting interval are equal, meaning that the sending period of the sampling value reporting packet has been reached, the NUP generates one sampling value reporting packet, fills the fields including a sampling number, a sampling value and other information in the sampling value reporting packet, sends the sampling value reporting packet to the CPU, and ends the processing.

Figure 4:
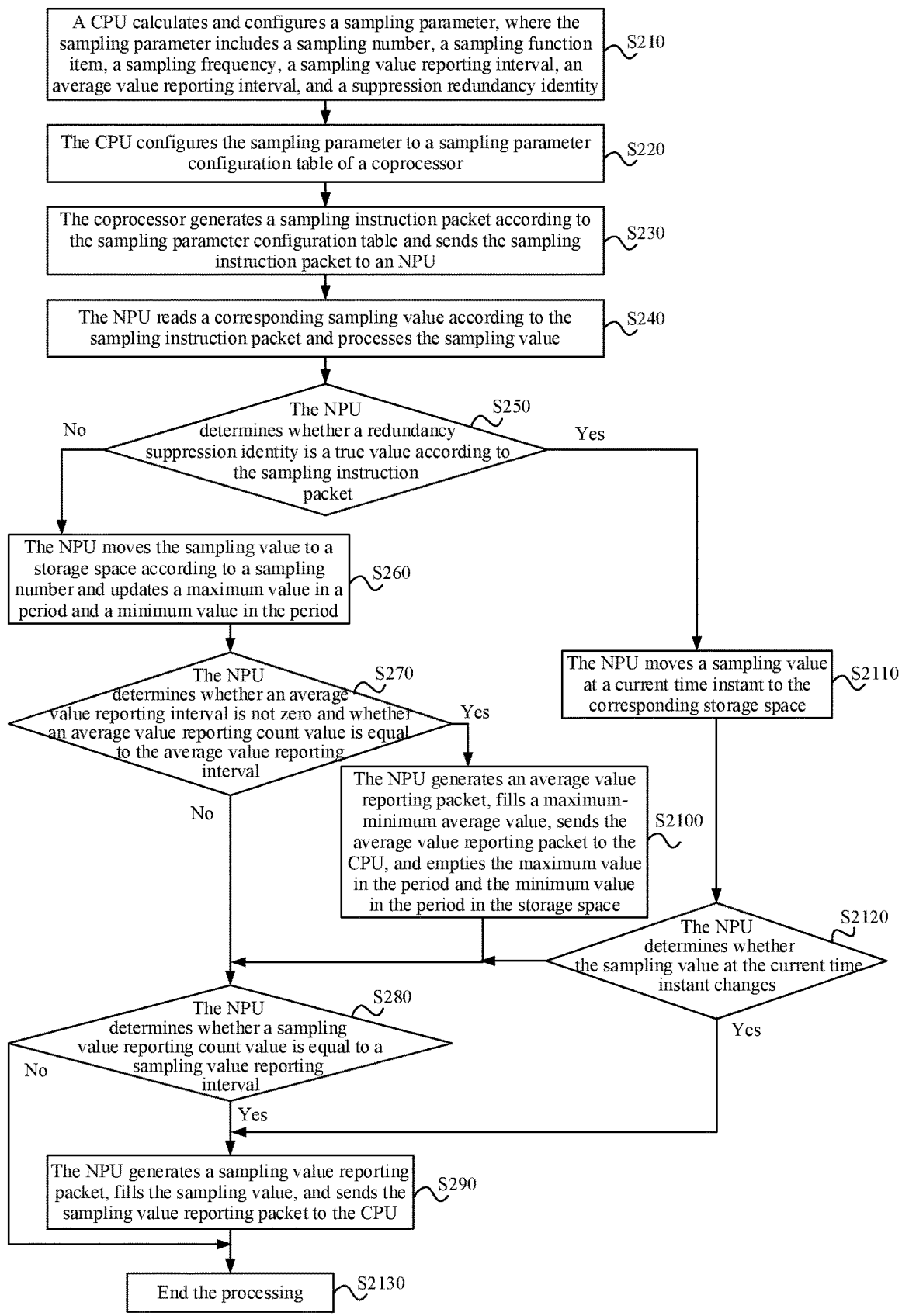
FIG. 4 is a flowchart of another data sampling method for a network device according to an embodiment of the present application.

FIG. 4 is a flowchart of another data sampling method for a network device according to an embodiment of the present application.

In S210, a CPU calculates and configured a sampling parameter, where the sampling parameter includes a sampling number, a sampling function item, a sampling frequency, a sampling value reporting interval, an average value reporting interval, and a suppression redundancy identity.

In S220, the CPU configures the sampling parameter to a sampling parameter configuration table of a coprocessor.

In S230, the coprocessor generates a sampling instruction packet according to the sampling parameter configuration table and sends the sampling instruction packet to an NPU.

In S240, the NPU reads a corresponding sampling value according to the sampling instruction packet and processes the sampling value.

In S250, the NPU determines whether a redundancy suppression identity is a true value according to the sampling instruction packet. If the redundancy suppression identity is a true value, S2110 is executed, and if the redundancy suppression identity is not a true value, S260 is executed.

In S260, the NPU moves the sampling value to a storage space according to a sampling number and updates a maximum value in a period and a minimum value in the period.

In S270, the NPU determines whether an average value reporting interval is not zero and whether an average value reporting count value is equal to the average value reporting interval. If the average value reporting interval is not zero and the average value reporting count value is equal to the average value reporting interval, S2100 is executed, and if the average value reporting interval is zero or the average value reporting count value is not equal to the average value reporting interval, S280 is executed.

In S280, the NPU determines whether a sampling value reporting count value is equal to a sampling value reporting interval. If the sampling value reporting count value is equal to the sampling value reporting interval, S290 is executed, and if the sampling value reporting count value is not equal to the sampling value reporting interval, S2130 is executed.

In S290, the NPU generates a sampling value reporting packet, fills the sampling value, and sends the sampling value reporting packet to the CPU.

In S2100, the NPU generates an average value reporting packet, fills a maximum-minimum average value, sends the average value reporting packet to the CPU, and empties the maximum value in the period and the minimum value in the period in the storage space.

In S2110, the NPU moves a sampling value at a current time instant to the corresponding storage space.

In S2120, the NPU determines whether the sampling value at the current time instant changes. If the sampling value at the current time instant changes, S290 is executed, and if the sampling value at the current time instant does not change, S280 is executed.

In S2130, the processing is ended.

In the solution provided by this embodiment, the coprocessor quickly sends the sampling message to the NPU for fast sampling, and the NPU moves the sampling value into the storage space and then periodically summarizes and sends the reporting message to the CPU, so as to achieve the fast sampling on the performance, alarm and state of the network device. Compared with the conventional CPU active sampling mode, in the above solution, a higher sampling frequency can be achieved (the statistical data can be sampled at a frequency faster than 100 times per second at most), avoiding consuming a large number of CPU processing resources, and saving the message channel bandwidth between the CPU and the NPU, thereby improving the statistical monitoring performance of the whole network data and providing a guarantee for the reliability of the telecommunication traffic.

Figure 5:
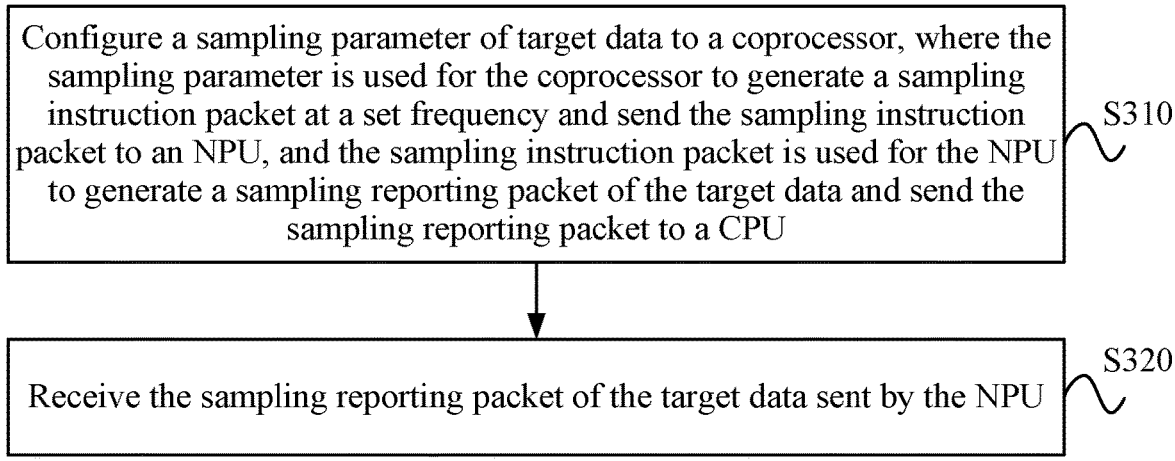
FIG. 5 is a flowchart of another data sampling method for a network device according to an embodiment of the present application.

In an example embodiment, FIG. 5 is a flowchart of another data sampling method for a network device according to an embodiment of the present application. This method is suitable for the case of performing, at a high frequency, sampling on the traffic (or performance) statistics, real-time alarms, real-time states and the like which are processed by the network device. This method may be performed by a data sampling apparatus for a network device provided by the present application, where the apparatus is applied in a CPU. The data sampling apparatus for a network device may be implemented by software and/or hardware and integrated into the CPU.

As shown in FIG. 5, the data sampling method for a network device provided by the present application is applied by a CPU and includes S310 and S320.

In S310, a sampling parameter of target data is configured to a coprocessor, where the sampling parameter is used for the coprocessor to generate a sampling instruction packet at a set frequency and send the sampling instruction packet to an NPU, and the sampling instruction packet is used for the NPU to generate a sampling reporting packet of the target data and send the sampling reporting packet to the CPU.

In an example, the sampling parameter at least includes a sampling number, a sampling function item, a sampling frequency, and a reporting interval.

The reporting interval includes a sampling value reporting interval and/or an average value reporting interval. The sampling value reporting interval defines the number of times of sampling every which the data sampling value is reported once, and the average value reporting interval defines the number of times of sampling every which the data average value is reported once.

The sampling value reporting interval is determined according to the sampling value reporting frequency and the sampling frequency, where the sampling value reporting frequency is a parameter set by the user and defines the number of times of data sampling value reporting per second, for example, the sampling value reporting interval is equal to the sampling frequency divided by the sampling value reporting frequency.

The average value reporting interval is determined according to the average value reporting frequency and the sampling frequency, where the average value reporting frequency is a parameter set by the user and defines the number of times of data average value reporting per second, for example, the average value reporting interval is equal to the sampling frequency divided by the average value reporting frequency.

In an example, the average value may refer to the average value of all sampling values in a period. In another example, the average value may refer to the average of a maximum sampling value and a minimum sampling value, that is, a maximum-minimum average value. This embodiment is described below using an example where the average value is the maximum-minimum average value.

In another example, the sampling parameter at least includes a sampling number, a sampling function item, a sampling frequency, a reporting interval, and a redundancy suppression identity.

The redundancy suppression identity is a parameter set by the user and is used for identifying whether a redundancy suppression function is required in the sampling process. The redundancy suppression identity is a valid value and corresponds to that the redundancy suppression function is required in the sampling process.

After the coprocessor reads the sampling parameter of target data configured by the CPU, the coprocessor generates the sampling instruction packet at the set frequency according to the sampling parameter and sends the sampling instruction packet to the NPU.

In an example, the coprocessor may generate the sampling instruction packet at the set frequency according to the sampling parameter in the following manner: for a sampling function item whose sampling frequency is not zero, the coprocessor generates a sampling instruction packet at the sampling frequency according to the sampling parameter.

In an example, the coprocessor may maintain a logical table inside the coprocessor itself, and the logical table may be called the sampling parameter configuration table herein and is used for describing the sampling function items that currently need to be performed and corresponding parameters. The fast sampling parameter configuration table is a logical table which can be accessed by the coprocessor and may be configured by the CPU, that is, the CPU may configure the sampling parameter into the sampling parameter configuration table, so as to control the coprocessor to generate the sampling instruction packet based on the sampling parameters in the sampling parameter configuration table and send the sampling instruction packet.

In an example, the sampling instruction packet carries a packet type, a sampling number, a sampling function item, a reporting count value, and a reporting interval; or the sampling instruction packet carries a packet type, a sampling number, a sampling function item, a reporting count value, a reporting interval, and a redundancy suppression identity. When the reporting interval includes a sampling value reporting interval, the reporting count value includes a sampling value reporting count value, and in sampling instruction packets sent sequentially, the sampling value reporting count value is sequentially increased from an initial value and reset to the initial value when the sampling value reporting count value is increased to the sampling value reporting interval. When the reporting interval is an average value reporting interval, the reporting count value includes an average value reporting count value, and for sampling function items whose average value reporting interval is not zero, in sampling instruction packets sent sequentially, the average value reporting count value is sequentially increased from an initial value and reset to the initial value when the average value reporting count value is increased to the average value reporting interval.

On the basis of examples described above, the sampling instruction packet may further include a sampling function item total number. The sampling function item total number is used for indicating the number of groups of sampling numbers and sampling function items included in the sampling instruction packet, and sampling function items in different groups have the same sampling frequency and the same reporting interval.

If a plurality of sampling function items is associated and has the same sampling frequency and reporting frequency, the plurality of sampling function items may be configured simultaneously. Further, the coprocessor may carry a plurality of sampling function items in one sampling instruction packet, and the sampling function item total number is carried in the sampling instruction packet.

In the present application, after the NPU receives the packets sent from the coprocessor, the NPU performs statistical analysis on various packets.

The NPU has a plurality of statistical registers, alarm registers and state registers inside the NPU itself, these registers correspond to different statistical function items, alarm items and status items, respectively, for indicating the statistic, alarm and state of the current network and device.

In addition, NPU can access, read and write a piece of memory space that may be called the sampling memory space, and the sampling memory space is configured to store sampling values, for example, the sampling memory space is configured to store sampling values in the form of a sampling value storage table.

The NPU generates the sampling reporting packet of the target data according to the sampling instruction packet and sends the sampling reporting packet to the CPU.

In an example, the NPU may generate the sampling reporting packet of the target data according to the sampling instruction packet in the following manner.

The NPU updates a locally stored sampling value according to the sampling instruction packet, and when the reporting count value in the sampling instruction packet is equal to the reporting interval, the NPU generates the sampling reporting packet of the target data according to the updated locally stored sampling value, where the sampling reporting packet includes a sampling value reporting packet and/or an average value reporting packet.

In another example, the NPU may generate the sampling reporting packet of the target data according to the sampling instruction packet in the following manner.

When the redundancy suppression identity in the sampling instruction packet is a valid value, the NPU updates a locally stored sampling value according to the sampling instruction packet and determines whether the sampling value at a current time instant changes. If the sampling value at the current time instant changes, the NPU generates the sampling reporting packet of the target data according to the locally stored sampling value and sends the sampling reporting packet to the CPU. If the sampling value at the current time instant does not change, when the reporting count value in the sampling instruction packet is equal to the reporting interval, the NPU generates the sampling reporting packet of the target data according to the locally stored sampling value and sends the sampling reporting packet to the CPU.

In S320, the sampling reporting packet of the target data sent by the NPU is received.

The CPU receives and analyzes the sampling reporting packet of the target data sent by the NPU, acquires the sampling value carried in the sampling reporting packet, performs setting processing on the sampling value and presents the sampling value to the human-machine interface.

For details that are not explained in this embodiment, reference may be made to the embodiments described above, and details are not repeated herein.

Compared with the conventional CPU active sampling mode, in the solution provided by this embodiment, a higher sampling frequency can be achieved (the statistical data can be sampled at a frequency faster than 100 times per second at most), avoiding consuming a large number of CPU processing resources, and saving the message channel bandwidth between the CPU and the NPU, thereby improving the statistical monitoring performance of the whole network data and providing a guarantee for the reliability of the telecommunication traffic.

Figure 6:
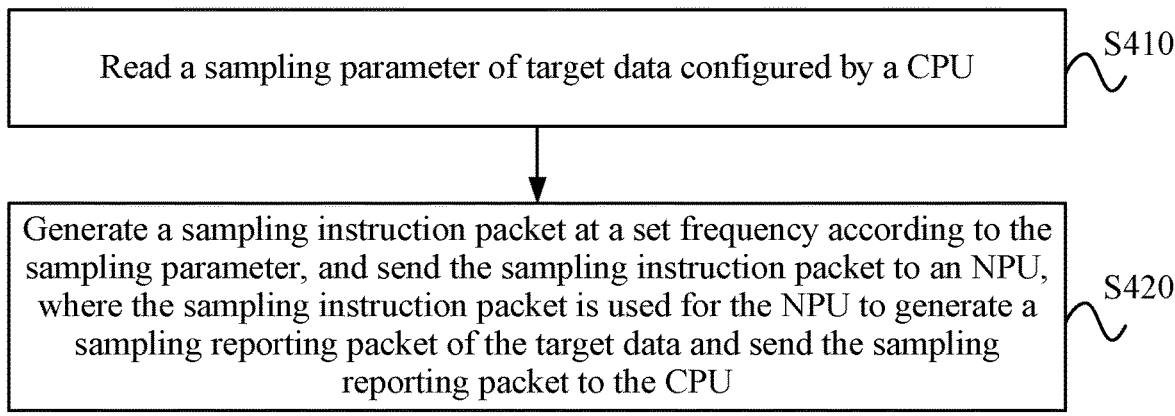
FIG. 6 is a flowchart of another data sampling method for a network device according to an embodiment of the present application.

In an example embodiment, FIG. 6 is a flowchart of another data sampling method for a network device according to an embodiment of the present application. This method is suitable for the case of performing, at a high frequency, sampling on the traffic (or performance) statistics, real-time alarms, real-time states and the like which are processed by the network device. This method may be performed by a data sampling apparatus for a network device provided by the present application, where the apparatus is applied in a coprocessor. The data sampling apparatus for a network device may be implemented by software and/or hardware and integrated into the coprocessor.

Optionally, the coprocessor is an external FPGA or a packet generator in the NPU and is not limited to this embodiment, and any apparatus having simple computing processing capability and fast packet generation capability in the network device may be used as the coprocessor.

As shown in FIG. 6, the data sampling method for a network device provided by the present application is applied by a coprocessor and includes S410 and S420.

In S410, a sampling parameter of target data configured by a CPU is read.

In an example, the sampling parameter at least includes a sampling number, a sampling function item, a sampling frequency, and a reporting interval.

The reporting interval includes a sampling value reporting interval and/or an average value reporting interval. The sampling value reporting interval defines the number of times of sampling every which the data sampling value is reported once, and the average value reporting interval defines the number of times of sampling every which the data average value is reported once.

The sampling value reporting interval is determined according to the sampling value reporting frequency and the sampling frequency, where the sampling value reporting frequency is a parameter set by the user and defines the number of times of data sampling value reporting per second, for example, the sampling value reporting interval is equal to the sampling frequency divided by the sampling value reporting frequency.

The average value reporting interval is determined according to the average value reporting frequency and the sampling frequency, where the average value reporting frequency is a parameter set by the user and defines the number of times of data average value reporting per second, for example, the average value reporting interval is equal to the sampling frequency divided by the average value reporting frequency.

In an example, the average value may refer to the average value of all sampling values in a period. In another example, the average value may refer to the average of a maximum sampling value and a minimum sampling value, that is, a maximum-minimum average value. This embodiment is described below using an example where the average value is the maximum-minimum average value.

In another example, the sampling parameter at least includes a sampling number, a sampling function item, a sampling frequency, a reporting interval, and a redundancy suppression identity.

The redundancy suppression identity is a parameter set by the user and is used for identifying whether a redundancy suppression function is required in the sampling process. The redundancy suppression identity is a valid value and corresponds to that the redundancy suppression function is required in the sampling process.

In S420, a sampling instruction packet is generated at a set frequency according to the sampling parameter, and the sampling instruction packet is sent to an NPU, where the sampling instruction packet is used for the NPU to generate a sampling reporting packet of the target data and send the sampling reporting packet to the CPU.

In an example, the coprocessor may generate the sampling instruction packet at the set frequency according to the sampling parameter in the following manner: for a sampling function item whose sampling frequency is not zero, the coprocessor generates a sampling instruction packet at the sampling frequency according to the sampling parameter.

In an example, the coprocessor may maintain a logical table inside the coprocessor itself, and the logical table may be called the sampling parameter configuration table herein and is used for describing the sampling function items that currently need to be performed and corresponding parameters. The fast sampling parameter configuration table is a logical table which can be accessed by the coprocessor and may be configured by the CPU, that is, the CPU may configure the sampling parameter into the sampling parameter configuration table, so as to control the coprocessor to send the sampling instruction packet based on the sampling parameters in the sampling parameter configuration table.

In an example, the sampling instruction packet carries a packet type, a sampling number, a sampling function item, a reporting count value, and a reporting interval; or the sampling instruction packet carries a packet type, a sampling number, a sampling function item, a reporting count value, a reporting interval, and a redundancy suppression identity. When the reporting interval includes a sampling value reporting interval, the reporting count value includes a sampling value reporting count value, and in sampling instruction packets sent sequentially, the sampling value reporting count value is sequentially increased from an initial value and reset to the initial value when the sampling value reporting count value is increased to the sampling value reporting interval. When the reporting interval is an average value reporting interval, the reporting count value includes an average value reporting count value, and for sampling function items whose average value reporting interval is not zero, in sampling instruction packets sent sequentially, the average value reporting count value is sequentially increased from an initial value and reset to the initial value when the average value reporting count value is increased to the average value reporting interval.

On the basis of examples described above, the sampling instruction packet may further include a sampling function item total number. The sampling function item total number is used for indicating the number of groups of sampling numbers and sampling function items included in the sampling instruction packet, and sampling function items in different groups have the same sampling frequency and the same reporting interval.

If a plurality of sampling function items is associated and has the same sampling frequency and reporting frequency, the plurality of sampling function items may be configured simultaneously. Further, the coprocessor may carry a plurality of sampling function items in one sampling instruction packet, and the sampling function item total number is carried in the sampling instruction packet.

In the present application, after the NPU receives the packets sent from the coprocessor, the NPU performs statistical analysis on various packets.

The NPU has a plurality of statistical registers, alarm registers and state registers inside the NPU itself, these registers correspond to different statistical function items, alarm items and status items, respectively, for indicating the statistic, alarm and state of the current network and device.

In addition, NPU can access, read and write a piece of memory space that may be called the sampling memory space, and the sampling memory space is configured to store sampling values, for example, the sampling memory space is configured to store sampling values in the form of a sampling value storage table.

The NPU generates the sampling reporting packet of the target data according to the sampling instruction packet and sends the sampling reporting packet to the CPU.

In an example, the NPU may generate the sampling reporting packet of the target data according to the sampling instruction packet in the following manner.

The NPU updates a locally stored sampling value according to the sampling instruction packet, and when the reporting count value in the sampling instruction packet is equal to the reporting interval, the NPU generates the sampling reporting packet of the target data according to the updated locally stored sampling value, where the sampling reporting packet includes a sampling value reporting packet and/or an average value reporting packet.

In another example, the NPU may generate the sampling reporting packet of the target data according to the sampling instruction packet in the following manner.

When the redundancy suppression identity in the sampling instruction packet is a valid value, the NPU updates a locally stored sampling value according to the sampling instruction packet and determines whether the sampling value at a current time instant changes. If the sampling value at the current time instant changes, the NPU generates the sampling reporting packet of the target data according to the locally stored sampling value and sends the sampling reporting packet to the CPU. If the sampling value at the current time instant does not change, when the reporting count value in the sampling instruction packet is equal to the reporting interval, the NPU generates the sampling reporting packet of the target data according to the locally stored sampling value and sends the sampling reporting packet to the CPU.

The CPU receives and analyzes the sampling reporting packet of the target data sent by the NPU, acquires the sampling value carried in the sampling reporting packet, performs setting processing on the sampling value and presents the sampling value to the human-machine interface.

For details that are not explained in this embodiment, reference may be made to the embodiments described above, and details are not repeated herein.

Compared with the conventional CPU active sampling mode, in the solution provided by this embodiment, a higher sampling frequency can be achieved (the statistical data can be sampled at a frequency faster than 100 times per second at most), avoiding consuming a large number of CPU processing resources, and saving the message channel bandwidth between the CPU and the NPU, thereby improving the statistical monitoring performance of the whole network data and providing a guarantee for the reliability of the telecommunication traffic.

Figure 7:
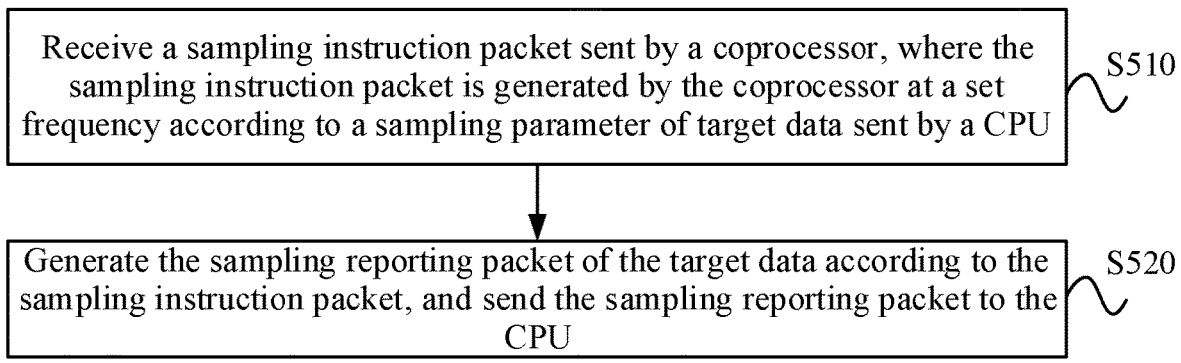
FIG. 7 is a flowchart of another data sampling method for a network device according to an embodiment of the present application.

In an example embodiment, FIG. 7 is a flowchart of another data sampling method for a network device according to an embodiment of the present application. This method is suitable for the case of performing, at a high frequency, sampling on the traffic (or performance) statistics, real-time alarms, real-time states and the like processed by the network device. This method may be performed by a data sampling apparatus for a network device provided by the present application, where the apparatus is applied in an NPU. The data sampling apparatus for a network device may be implemented by software and/or hardware and integrated into the NPU.

As shown in FIG. 7, the data sampling method for a network device provided by the present application is applied by an NPU and includes S510 and S520.

In S510, a sampling instruction packet sent by a coprocessor is received, where the sampling instruction packet is generated by the coprocessor at a set frequency according to a sampling parameter of target data sent by a CPU.

The CPU configures the sampling parameter of the target data to the coprocessor. In an example, the sampling parameter at least includes a sampling number, a sampling function item, a sampling frequency, and a reporting interval.

The reporting interval includes a sampling value reporting interval and/or an average value reporting interval. The sampling value reporting interval defines the number of times of sampling every which the data sampling value is reported once, and the average value reporting interval defines the number of times of sampling every which the data average value is reported once.

The sampling value reporting interval is determined according to the sampling value reporting frequency and the sampling frequency, where the sampling value reporting frequency is a parameter set by the user and defines the number of times of data sampling value reporting per second, for example, the sampling value reporting interval is equal to the sampling frequency divided by the sampling value reporting frequency.

The average value reporting interval is determined according to the average value reporting frequency and the sampling frequency, where the average value reporting frequency is a parameter set by the user and defines the number of times of data average value reporting per second, for example, the average value reporting interval is equal to the sampling frequency divided by the average value reporting frequency.

In an example, the average value may refer to the average value of all sampling values in a period. In another example, the average value may refer to the average of a maximum sampling value and a minimum sampling value, that is, a maximum-minimum average value. This embodiment is described below using an example where the average value is the maximum-minimum average value.

In another example, the sampling parameter at least includes a sampling number, a sampling function item, a sampling frequency, a reporting interval, and a suppression redundancy identity.

The redundancy suppression identity is a parameter set by the user and is used for identifying whether a redundancy suppression function is required in the sampling process. The redundancy suppression identity is a valid value and corresponds to that the redundancy suppression function is required in the sampling process.

The coprocessor generates the sampling instruction packet at the set frequency according to the sampling parameter and sends the sampling instruction packet to the NPU.

In an example, the coprocessor may generate the sampling instruction packet at the set frequency according to the sampling parameter in the following manner: for a sampling function item whose sampling frequency is not zero, the coprocessor generates a sampling instruction packet at the sampling frequency according to the sampling parameter.

The coprocessor may maintain a logical table inside the coprocessor itself, and the logical table may be called the sampling parameter configuration table herein and is used for describing the sampling function items that currently need to be performed and corresponding parameters. The fast sampling parameter configuration table is a logical table which can be accessed by the coprocessor and may be configured by the CPU, that is, the CPU may configure the sampling parameter into the sampling parameter configuration table, so as to control the coprocessor to send the sampling instruction packet based on the sampling parameters in the sampling parameter configuration table.

In an example, the sampling instruction packet carries a packet type, a sampling number, a sampling function item, a reporting count value, and a reporting interval; or the sampling instruction packet carries a packet type, a sampling number, a sampling function item, a reporting count value, a reporting interval, and a redundancy suppression identity. When the reporting interval includes a sampling value reporting interval, the reporting count value includes a sampling value reporting count value, and in sampling instruction packets sent sequentially, the sampling value reporting count value is sequentially increased from an initial value and reset to the initial value when the sampling value reporting count value is increased to the sampling value reporting interval. When the reporting interval is an average value reporting interval, the reporting count value includes an average value reporting count value, and for sampling function items whose average value reporting interval is not zero, in sampling instruction packets sent sequentially, the average value reporting count value is sequentially increased from an initial value and reset to the initial value when the average value reporting count value is increased to the average value reporting interval.

On the basis of examples described above, the sampling instruction packet may further include a sampling function item total number. The sampling function item total number is used for indicating the number of groups of sampling numbers and sampling function items included in the sampling instruction packet, and sampling function items in different groups have the same sampling frequency and the same reporting interval.

If a plurality of sampling function items is associated and has the same sampling frequency and reporting frequency, the plurality of sampling function items may be configured simultaneously. Further, the coprocessor may carry a plurality of sampling function items in one sampling instruction packet, and the sampling function item total number is carried in the sampling instruction packet.

In S520, the sampling reporting packet of the target data is generated according to the sampling instruction packet, and the sampling reporting packet is sent to the CPU.

In the present application, after the NPU receives the online packets, the NPU performs statistical analysis on various packets.

The NPU has a plurality of statistical registers, alarm registers and state registers inside the NPU itself, these registers correspond to different statistical function items, alarm items and status items, respectively, for indicating the statistic, alarm and state of the current network and device.

In addition, NPU can access, read and write a piece of memory space that may be called the sampling memory space, and the sampling memory space is configured to store sampling values, for example, the sampling memory space is configured to store sampling values in the form of a sampling value storage table.

In an example, the NPU may generate the sampling reporting packet of the target data according to the sampling instruction packet in the following manner.

A locally stored sampling value is updated according to the sampling instruction packet, and when the reporting count value in the sampling instruction packet is equal to the reporting interval, the sampling reporting packet of the target data is generated according to the updated locally stored sampling value and sent to the CPU, where the sampling reporting packet includes a sampling value reporting packet and/or an average value reporting packet.

In another example, the NPU may generate the sampling reporting packet of the target data according to the sampling instruction packet in the following manner.

When the redundancy suppression identity in the sampling instruction packet is a valid value, the NPU updates a locally stored sampling value according to the sampling instruction packet and determines whether the sampling value at a current time instant changes. If the sampling value at the current time instant changes, the NPU generates the sampling reporting packet of the target data according to the locally stored sampling value and sends the sampling reporting packet to the CPU. If the sampling value at the current time instant does not change, when the reporting count value in the sampling instruction packet is equal to the reporting interval, the NPU generates the sampling reporting packet of the target data according to the locally stored sampling value and sends the sampling reporting packet to the CPU, where the sampling reporting packet includes a sampling value reporting packet and/or an average value reporting packet.

The CPU receives and analyzes the sampling reporting packet of the target data sent by the NPU, acquires the sampling value carried in the sampling reporting packet, performs setting processing on the sampling value and presents the sampling value to the human-machine interface.

For details that are not explained in this embodiment, reference may be made to the embodiments described above, and details are not repeated herein.

Compared with the conventional CPU active sampling mode, in the solution provided by this embodiment, a higher sampling frequency can be achieved (the statistical data can be sampled at a frequency faster than 100 times per second at most), avoiding consuming a large number of CPU processing resources, and saving the message channel bandwidth between the CPU and the NPU, thereby improving the statistical monitoring performance of the whole network data and providing a guarantee for the reliability of the telecommunication traffic.

Figure 8:
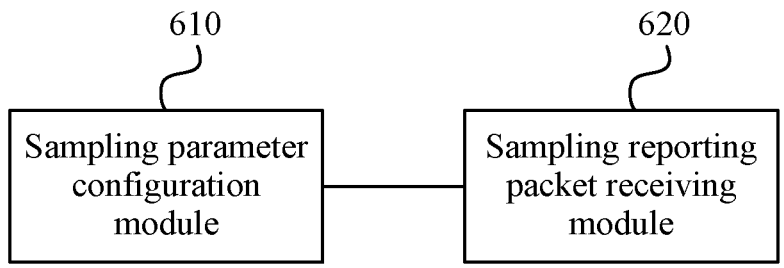
FIG. 8 is a schematic diagram of the module structure of a data sampling apparatus for a network device according to an embodiment of the present application.

An embodiment of the present application further provides a data sampling apparatus for a network device. FIG. 8 is a structural diagram of the data sampling apparatus for a network device according to this embodiment of the present application. As shown in FIG. 8, the data sampling apparatus for a network device provided by this embodiment of the present application is applied in a CPU, may be implemented by software and/or hardware and integrated into the CPU. The apparatus includes a sampling parameter configuration module 610 and a sampling reporting packet receiving module 620.

The sampling parameter configuration module 610 is configured to configure a sampling parameter of target data to a coprocessor, where the sampling parameter is used for the coprocessor to generate a sampling instruction packet at a set frequency and send the sampling instruction packet to an NPU, and the sampling instruction packet is used for the NPU to generate a sampling reporting packet of the target data and send the sampling reporting packet to the CPU. The sampling reporting packet receiving module 620 is configured to receive the sampling reporting packet of the target data sent by the NPU.

Compared with the conventional CPU active sampling mode, in the solution provided by this embodiment, a higher sampling frequency can be achieved (the statistical data can be sampled at a frequency faster than 100 times per second at most), avoiding consuming a large number of CPU processing resources, and saving the message channel bandwidth between the CPU and the NPU, thereby improving the statistical monitoring performance of the whole network data and providing a guarantee for the reliability of the telecommunication traffic.

In an example, the sampling parameter at least includes: a sampling number, a sampling function item, a sampling frequency, and a reporting interval; or the sampling parameter at least includes: a sampling number, a sampling function item, a sampling frequency, a reporting interval, and a redundancy suppression identity; where the reporting interval includes a sampling value reporting interval and/or an average value reporting interval, the sampling value reporting interval is determined according to a sampling value reporting frequency and the sampling frequency, and the average value reporting interval is determined according to an average value reporting frequency and the sampling frequency.

In an example, the sampling instruction packet carries a packet type, a sampling number, a sampling function item, a reporting count value, and a reporting interval; or the sampling instruction packet carries a packet type, a sampling number, a sampling function item, a reporting count value, a reporting interval, and a redundancy suppression identity. When the reporting interval includes a sampling value reporting interval, the reporting count value includes a sampling value reporting count value, and in sampling instruction packets sent sequentially, the sampling value reporting count value is sequentially increased from an initial value and reset to the initial value when the sampling value reporting count value is increased to the sampling value reporting interval. When the reporting interval is an average value reporting interval, the reporting count value is an average value reporting count value, and for sampling function items whose average value reporting interval is not zero, in sampling instruction packets sent sequentially, the average value reporting count value is sequentially increased from an initial value and reset to the initial value when the average value reporting count value is increased to the average value reporting interval.

In an example, the sampling instruction packet further includes a sampling function item total number. The sampling function item total number is used for indicating the number of groups of sampling numbers and sampling function items included in the sampling instruction packet, and sampling function items in different groups have the same sampling frequency and the same reporting interval.

The data sampling apparatus for a network device applied in the CPU provided by this embodiment is configured to perform the data sampling method for a network device applied by the CPU provided by the embodiments of the present application. The data sampling apparatus for a network device applied in the CPU provided by this embodiment has implementation principles and effects similar to those of the data sampling method for a network device applied by the CPU provided by the embodiments of the present application, and details are not repeated herein.

Figure 9:
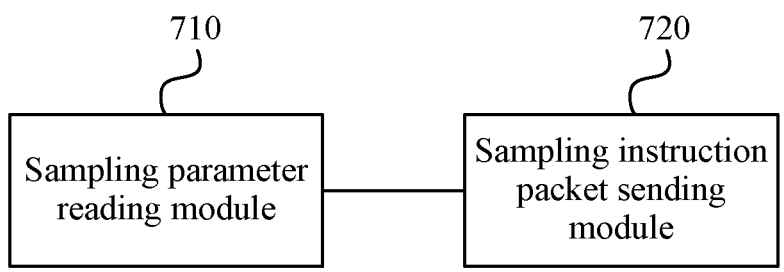
FIG. 9 is a schematic diagram of the module structure of another data sampling apparatus for a network device according to an embodiment of the present application.

An embodiment of the present application further provides a data sampling apparatus for a network device. FIG. 9 is a structural diagram of another data sampling apparatus for a network device according to this embodiment of the present application. As shown in FIG. 9, the data sampling apparatus for a network device provided by this embodiment of the present application is applied in a coprocessor, may be implemented by software and/or hardware and integrated into the coprocessor. The apparatus includes a sampling parameter reading module 710 and a sampling instruction packet sending module 720.

The sampling parameter reading module 710 is configured to read a sampling parameter of target data configured by a CPU. The sampling instruction packet sending module 720 is configured to generate a sampling instruction packet at a set frequency according to the sampling parameter and send the sampling instruction packet to an NPU, where the sampling instruction packet is used for the NPU to generate a sampling reporting packet of the target data and send the sampling reporting packet to the CPU.

Compared with the conventional CPU active sampling mode, in the solution provided by this embodiment, a higher sampling frequency can be achieved (the statistical data can be sampled at a frequency faster than 100 times per second at most), avoiding consuming a large number of CPU processing resources, and saving the message channel bandwidth between the CPU and the NPU, thereby improving the statistical monitoring performance of the whole network data and providing a guarantee for the reliability of the telecommunication traffic.

In an example, the sampling parameter at least includes: a sampling number, a sampling function item, a sampling frequency, and a reporting interval; or the sampling parameter at least includes: a sampling number, a sampling function item, a sampling frequency, a reporting interval, and a redundancy suppression identity; where the reporting interval includes a sampling value reporting interval and/or an average value reporting interval, the sampling value reporting interval is determined according to a sampling value reporting frequency and the sampling frequency, and the average value reporting interval is determined according to an average value reporting frequency and the sampling frequency.

In an example, the sampling instruction packet sending module 720 is configured to, for a sampling function item whose sampling frequency is not zero, generate a sampling instruction packet at the sampling frequency according to the sampling parameter and send sampling instruction packet to the NPU, where the sampling instruction packet carries a packet type, a sampling number, a sampling function item, a reporting count value, and a reporting interval or the sampling instruction packet carries a packet type, a sampling number, a sampling function item, a reporting count value, a reporting interval, and a redundancy suppression identity. When the reporting interval includes a sampling value reporting interval, the reporting count value includes a sampling value reporting count value, and in sampling instruction packets sent sequentially, the sampling value reporting count value is sequentially increased from an initial value and reset to the initial value when the sampling value reporting count value is increased to the sampling value reporting interval. When the reporting interval is an average value reporting interval, the reporting count value includes an average value reporting count value, and for sampling function items whose average value reporting interval is not zero, in sampling instruction packets sent sequentially, the average value reporting count value is sequentially increased from an initial value and reset to the initial value when the average value reporting count value is increased to the average value reporting interval.

In an example, the sampling instruction packet further includes a sampling function item total number. The sampling function item total number is used for indicating the number of groups of sampling numbers and sampling function items included in the sampling instruction packet, and sampling function items in different groups have the same sampling frequency and the same reporting interval.

The data sampling apparatus for a network device applied in the coprocessor provided by this embodiment is configured to perform the data sampling method for a network device applied by the coprocessor provided by the embodiments of the present application. The data sampling apparatus for a network device applied in the coprocessor provided by this embodiment has implementation principles and effects similar to those of the data sampling method for a network device applied by the coprocessor provided by the embodiments of the present application, and details are not repeated herein.

Figure 10:
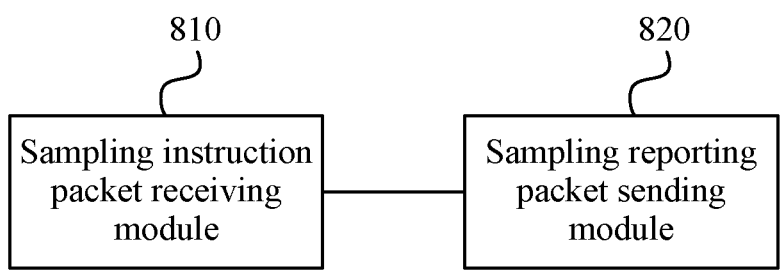
FIG. 10 is a schematic diagram of the module structure of another data sampling apparatus for a network device according to an embodiment of the present application.

An embodiment of the present application further provides a data sampling apparatus for a network device. FIG. 10 is a structural diagram of another data sampling apparatus for a network device according to this embodiment of the present application. As shown in FIG. 10, the data sampling apparatus for a network device provided by this embodiment of the present application is applied in an NPU, may be implemented by software and/or hardware and integrated into the NPU. The apparatus includes a sampling instruction packet receiving module 810 and a sampling reporting packet sending module 820.

The sampling instruction packet receiving module 810 is configured to receive a sampling instruction packet sent by a coprocessor, where the sampling instruction packet is generated by the coprocessor at a set frequency according to a sampling parameter of target data sent by a CPU. The sampling reporting packet sending module 820 is configured to generate a sampling reporting packet of the target data according to the sampling instruction packet and send the sampling reporting packet to the CPU.

Compared with the conventional CPU active sampling mode, in the solution provided by this embodiment, a higher sampling frequency can be achieved (the statistical data can be sampled at a frequency faster than 100 times per second at most), avoiding consuming a large number of CPU processing resources, and saving the message channel bandwidth between the CPU and the NPU, thereby improving the statistical monitoring performance of the whole network data and providing a guarantee for the reliability of the telecommunication traffic.

In an example, the sampling parameter at least includes: a sampling number, a sampling function item, a sampling frequency, and a reporting interval; or the sampling parameter at least includes: a sampling number, a sampling function item, a sampling frequency, a reporting interval, and a redundancy suppression identity; where the reporting interval includes a sampling value reporting interval and/or an average value reporting interval, the sampling value reporting interval is determined according to a sampling value reporting frequency and the sampling frequency, and the average value reporting interval is determined according to an average value reporting frequency and the sampling frequency.

In an example, the sampling instruction packet carries a packet type, a sampling number, a sampling function item, a reporting count value, and a reporting interval; or the sampling instruction packet carries a packet type, a sampling number, a sampling function item, a reporting count value, a reporting interval, and a redundancy suppression identity. When the reporting interval includes a sampling value reporting interval, the reporting count value includes a sampling value reporting count value, and in sampling instruction packets sent sequentially, the sampling value reporting count value is sequentially increased from an initial value and reset to the initial value when the sampling value reporting count value is increased to the sampling value reporting interval. When the reporting interval is an average value reporting interval, the reporting count value is an average value reporting count value, and for sampling function items whose average value reporting interval is not zero, in sampling instruction packets sent sequentially, the average value reporting count value is sequentially increased from an initial value and reset to the initial value when the average value reporting count value is increased to the average value reporting interval.

In an example, the sampling reporting packet sending module 820 is configured to update a locally stored sampling value according to the sampling instruction packet, and when the reporting count value in the sampling instruction packet is equal to the reporting interval, generate the sampling reporting packet of the target data according to the updated locally stored sampling value and send the sampling reporting packet to the CPU, where the sampling reporting packet includes a sampling value reporting packet and/or an average value reporting packet.

In an example, the sampling reporting packet sending module 820 is configured to, when the redundancy suppression identity in the sampling instruction packet is a valid value, update a locally stored sampling value according to the sampling instruction packet and determine whether the sampling value at a current time instant changes; if the sampling value at the current time instant changes, generate the sampling reporting packet of the target data according to the locally stored sampling value and send the sampling reporting packet to the CPU; and if the sampling value at the current time instant does not change, when the reporting count value in the sampling instruction packet is equal to the reporting interval, generate the sampling reporting packet of the target data according to the locally stored sampling value and send the sampling reporting packet to the CPU; where the sampling reporting packet includes a sampling value reporting packet and/or an average value reporting packet.

The data sampling apparatus for a network device applied in the NPU provided by this embodiment is configured to perform the data sampling method for a network device applied by the NPU provided by the embodiments of the present application. The data sampling apparatus for a network device applied in the NPU provided by this embodiment has implementation principles and effects similar to those of the data sampling method for a network device applied by the NPU provided by the embodiments of the present application, and details are not repeated herein.

Figure 11:
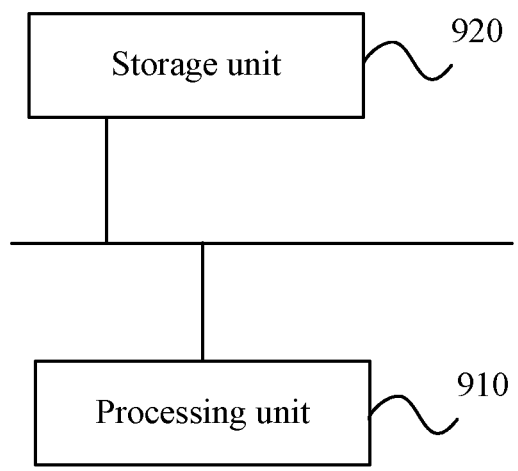
FIG. 11 is a structural diagram of a CPU according to an embodiment of the present application.

An embodiment of the present application provides a CPU. FIG. 11 is a structural diagram of the CPU according to this embodiment of the present application. As shown in FIG. 11, the CPU provided by the present application includes one or more processing units 910 and a storage unit 920. One or more processing units 910 are provided in the CPU. In FIG. 11, one processing unit 910 is used as an example. The storage unit 920 is configured to store one or more programs, where the one or more programs are executed by the one or more processing units 910 to enable the one or more processing units 910 to perform the data sampling method for a network device applied by the CPU provided by the embodiments of the present application.

The processing unit 910 and the storage unit 920 in the CPU are connected via a bus or in other manners. The connection via a bus is used as an example in FIG. 11.

As a computer-readable storage medium, the storage unit 920 may be configured to store software programs and computer-executable programs and modules, such as program instructions/modules (for example, the sampling parameter configuration module 610 and the sampling reporting packet receiving module 620 in the data sampling apparatus for a network device applied in the CPU shown in FIG. 8) corresponding to the data sampling method for a network device applied by the CPU provided by the embodiments of the present application. The storage unit 920 may include a program storage region and a data storage region, where the program storage region may store an operating system and an application program required by at least one function, and the data storage region may store data created depending on the use of the device. Moreover, the storage unit 920 may include a high-speed random-access memory, and may further include a non-volatile memory such as at least one magnetic disk memory, a flash memory or another non-volatile solid-state memory.

Figure 12:
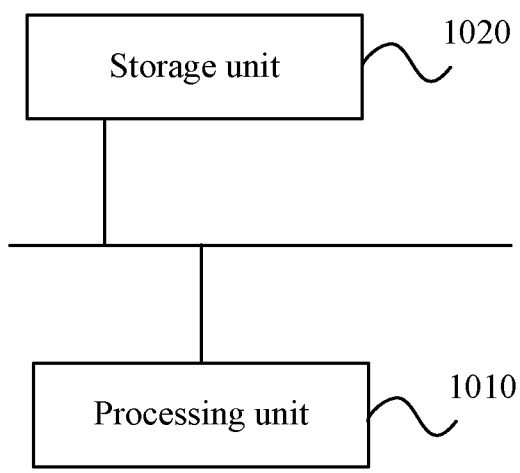
FIG. 12 is a structural diagram of a coprocessor according to an embodiment of the present application.

An embodiment of the present application provides a coprocessor. FIG. 12 is a structural diagram of the coprocessor according to this embodiment of the present application. As shown in FIG. 12, the coprocessor provided by the present application includes one or more processing units 1010 and a storage unit 1020. One or more processing units 1010 are provided in the coprocessor. In FIG. 12, one processing unit 1010 is used as an example. The storage unit 1020 is configured to store one or more programs, where the one or more programs are executed by the one or more processing units 1010 to enable the one or more processing units 1010 to perform the data sampling method for a network device applied by the coprocessor provided by the embodiments of the present application.

The processing unit 1010 and the storage unit 1020 in the coprocessor are connected via a bus or in other manners. The connection via a bus is used as an example in FIG. 12.

As a computer-readable storage medium, the storage unit 1020 may be configured to store software programs and computer-executable programs and modules, such as program instructions/modules (for example, the sampling parameter reading module 710 and a sampling instruction packet sending module 720 in the data sampling apparatus for a network device applied in the coprocessor shown in FIG. 9) corresponding to the data sampling method for a network device applied by the coprocessor provided by the embodiments of the present application. The storage unit 1020 may include a program storage region and a data storage region, where the program storage region may store an operating system and an application program required by at least one function, and the data storage region may store data created depending on the use of the device. Moreover, the storage unit 1020 may include a high-speed random-access memory, and may further include a non-volatile memory such as at least one magnetic disk memory, a flash memory or another non-volatile solid-state memory.

Figure 13:
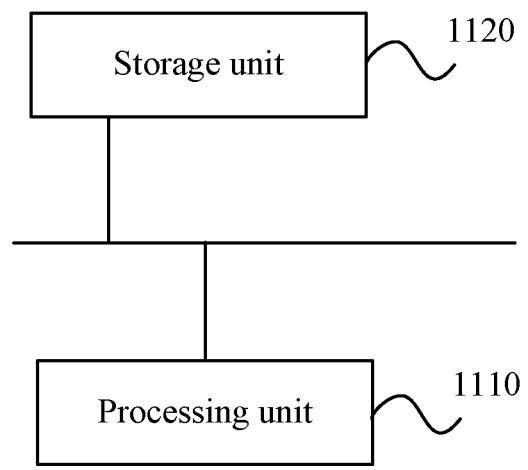
FIG. 13 is a structural diagram of an NPU according to an embodiment of the present application.

An embodiment of the present application provides an NPU. FIG. 13 is a structural diagram of the NPU according to this embodiment of the present application. As shown in FIG. 13, the NPU provided by the present application includes one or more processing units 1110 and a storage unit 1120. One or more processing units 1110 are provided in the NPU. In FIG. 13, one processing unit 1110 is used as an example. The storage unit 1120 is configured to store one or more programs, where the one or more programs are executed by the one or more processing units 1110 to enable the one or more processing units 1110 to perform the data sampling method for a network device applied by the NPU provided by the embodiments of the present application.

The processing unit 1110 and the storage unit 1120 in the coprocessor are connected via a bus or in other manners. The connection via a bus is used as an example in FIG. 13.

As a computer-readable storage medium, the storage unit 1120 may be configured to store software programs and computer-executable programs and modules, such as program instructions/modules (for example, the sampling instruction packet receiving module 810 and the sampling reporting packet sending module 820 in the data sampling apparatus for a network device applied in the NPU shown in FIG. 10) corresponding to the data sampling method for a network device applied by the NPU provided by the embodiments of the present application. The storage unit 1120 may include a program storage region and a data storage region, where the program storage region may store an operating system and an application program required by at least one function, and the data storage region may store data created depending on the use of the device. Moreover, the storage unit 1120 may include a high-speed random-access memory, and may further include a non-volatile memory such as at least one magnetic disk memory, a flash memory or another non-volatile solid-state memory.

An embodiment of the present application provides a network device. As shown in FIG. 2, the network device includes a CPU, a coprocessor, and an NPU.

The CPU is configured to perform the data sampling method for a network device applied by the CPU provided by any embodiment of the present application, the coprocessor is configured to perform the data sampling method for a network device applied by the coprocessor provided by any embodiment of the present application, and the NPU is configured to perform the data sampling method for a network device applied by the NPU provided by any embodiment of the present application.

In an example, the coprocessor is an external FPGA of the network device.

In an example, the coprocessor is a packet generator in the NPU.

For details that are not explained in this embodiment, reference may be made to the embodiments described above, and details are not repeated herein.

An embodiment of the present application further provides a storage medium. The storage medium is configured to store a computer program. The computer program, when executed by a processor, implements the data sampling method for a network device applied by the CPU provided by the embodiments of the present application, the data sampling method for a network device applied by the coprocessor provided by the embodiments of the present application, the data sampling method for a network device applied by the NPU provided by the embodiments of the present application or the data sampling method for a network device applied by the network device provided by the embodiments of the present application.

The data sampling method for a network device applied by the CPU includes the following.

A sampling parameter of target data is configured to a coprocessor, where the sampling parameter is used for the coprocessor to generate a sampling instruction packet at a set frequency and send the sampling instruction packet to an NPU, and the sampling instruction packet is used for the NPU to generate a sampling reporting packet of the target data and send the sampling reporting packet to the CPU; and the sampling reporting packet of the target data sent by the NPU is received.

The data sampling method for a network device applied by the coprocessor includes the following.

A sampling parameter of target data configured by a CPU is read; and a sampling instruction packet is generated at a set frequency according to the sampling parameter and sent to an NPU, where the sampling instruction packet is used for the NPU to generate a sampling reporting packet of the target data and send the sampling reporting packet to the CPU.

The data sampling method for a network device applied by the NPU includes the following.

A sampling instruction packet sent by a coprocessor is received, where the sampling instruction packet is generated by the coprocessor at a set frequency according to a sampling parameter of target data sent by a CPU; and a sampling reporting packet of the target data is generated according to the sampling instruction packet, and the sampling reporting packet is sent to the CPU.

The data sampling method for a network device applied by the network device includes the following.

A CPU configures a sampling parameter of target data to a coprocessor; the coprocessor generates a sampling instruction packet at a set frequency according to the sampling parameter and sends the sampling instruction packet to an NPU; and the NPU generates a sampling reporting packet of the target data according to the sampling instruction packet and sends the sampling reporting packet to the CPU.

Optionally, the computer-executable instructions, when executed by a computer processor, are used for implementing the data sampling method for a network device applied by the CPU provided by any embodiment of the present application, the data sampling method for a network device applied by the coprocessor provided by any embodiment of the present application, the data sampling method for a network device applied by the NPU provided by any embodiment of the present application or the data sampling method for a network device applied by the network device provided by any embodiment of the present application.

From the preceding description of the embodiments, the present application may be implemented by means of both software and required general-purpose hardware, and also by means of hardware. The solutions of the present application may essentially be embodied in the form of a software product. The software product in a computer may be stored in a computer-readable storage medium such as a floppy disk, read-only memory (ROM), random-access memory (RAM), flash memory, hard disk or optical disc in the computer and includes multiple instructions for enabling a communication device (which may be a personal computer, a server or a network device) to perform the methods of the embodiments of the present application.

Units and modules involved in the embodiments of the data sampling apparatus for a network device applied in the CPU, the data sampling apparatus for a network device applied in the coprocessor or the data sampling apparatus for a network device applied in the NPU are just divided according to functional logic, and the division is not limited to this, as long as the corresponding functions can be achieved. In addition, the names of each functional unit are just intended for distinguishing and are not to limit the protection scope of the present application.

In general, multiple embodiments of the present application may be implemented in hardware or special-purpose circuits, software, logic, or any combination thereof. For example, some aspects may be implemented in hardware, while other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable for a local technical environment and may be implemented using any suitable data storage technology, such as, but not limited to, a read-only memory (ROM), a random access memory (RAM) and an optical memory apparatus and system (a digital video disc (DVD) or a compact disk (CD)). Computer-readable media may include non-transitory storage media. The data processor may be in any type suitable for the local technical environment, for example, but not limited to, a general-purpose computer, a special-purpose computer, a microprocessor, a digital signal processing (DSP), an application-specific integrated circuit (ASIC), an FGPA, and a processor based on a multi-core processor architecture.

What is claimed is:

1. A data sampling method for a network device, applied by the network device and comprising:
   configuring, by a central processing unit (CPU), a sampling parameter of target data to a coprocessor, wherein the CPU is preset with a user configuration parameter and obtains the sampling parameter after processing the user configuration parameter;
   generating, by the coprocessor, a sampling instruction packet at a set frequency according to the sampling parameter, and sending the sampling instruction packet to a network processor; and
   generating, by the network processor, a sampling reporting packet of the target data based on a current locally stored sampling value according to the sampling instruction packet, and sending the sampling reporting packet to the CPU.

2. The method of claim 1, wherein the sampling parameter comprises:
   a sampling number, a sampling function item, a sampling frequency, and a reporting interval; or the sampling parameter comprises: a sampling number, a sampling function item, a sampling frequency, a reporting interval, and a redundancy suppression identity;
   wherein the reporting interval comprises at least one of a sampling value reporting interval or an average value reporting interval, the sampling value reporting interval is determined according to a sampling value reporting frequency and the sampling frequency, and the average value reporting interval is determined according to an average value reporting frequency and the sampling frequency.

3. The method of claim 2, wherein generating, by the coprocessor, the sampling instruction packet at the set frequency according to the sampling parameter comprises:
   for a sampling function item whose sampling frequency is not zero in the sampling parameter, generating, by the coprocessor according to the sampling parameter, a sampling instruction packet at the sampling frequency that is not zero;
   wherein the sampling instruction packet carries a packet type, a sampling number, a sampling function item, a reporting count value, and a reporting interval; or the sampling instruction packet carries a packet type, a sampling number, a sampling function item, a reporting count value, a reporting interval, and a redundancy suppression identity;
   in a case where the reporting interval comprises the sampling value reporting interval, the reporting count value comprises a sampling value reporting count value; sampling value reporting count values in sampling instruction packets sent sequentially are sequentially increased from an initial value to the sampling value reporting interval, and in a case where a sampling value reporting count value in a sent sampling instruction packet is the sampling value reporting interval, a sampling value reporting count value in a sampling instruction packet sent next is reset to the initial value;
   in a case where the reporting interval comprises the average value reporting interval, the reporting count value comprises an average value reporting count value; for sampling function items whose average value reporting interval is not zero, average value reporting count values in sampling instruction packets sent sequentially are sequentially increased from an initial value to the average value reporting interval, and in a case where an average value reporting count value in a sent sampling instruction packet is the average value reporting interval, an average value reporting count value in a sampling instruction packet sent next is reset to the initial value.

4. The method of claim 3, wherein the sampling instruction packet further comprises a total number of sampling function items, and the total number of sampling function items is used for indicating a number of groups of sampling numbers and sampling function items comprised in the sampling instruction packet;
   sampling function items in different groups have a same sampling frequency and a same reporting interval.

5. The method of claim 3, wherein generating, by the network processor, the sampling reporting packet of the target data according to the sampling instruction packet comprises:
   updating, by the network processor, a locally stored sampling value according to the sampling instruction packet; and
   in a case where the reporting count value in the sampling instruction packet is equal to the reporting interval, generating, by the network processor, the sampling reporting packet of the target data according to the updated locally stored sampling value;
   wherein the sampling reporting packet comprises at least one of a sampling value reporting packet and an average value reporting packet.

6. The method of claim 3, wherein generating, by the network processor, the sampling reporting packet of the target data according to the sampling instruction packet comprises:
   in a case where the redundancy suppression identity in the sampling instruction packet is a valid value, updating, by the network processor, a locally stored sampling value according to the sampling instruction packet, and determining whether a sampling value at a current time instant changes;
   in response to determining that the sampling value at the current time instant changes, generating, by the network processor, the sampling reporting packet of the target data according to the updated locally stored sampling value; and
   in response to determining that the sampling value at the current time instant does not change, in a case where the reporting count value in the sampling instruction packet is equal to the reporting interval, generating, by the network processor, the sampling reporting packet of the target data according to the updated locally stored sampling value, and sending the sampling reporting packet to the CPU;
   wherein the sampling reporting packet comprises at least one of a sampling value reporting packet and an average value reporting packet.

7. A data sampling method for a network device, applied by a coprocessor and comprising:

reading a sampling parameter of target data configured by a central processing unit (CPU), wherein the CPU is preset with a user configuration parameter and obtains the sampling parameter after processing the user configuration parameter; and generating a sampling instruction packet at a set frequency according to the sampling parameter, and sending the sampling instruction packet to a network processor, wherein the sampling instruction packet is used for the network processor to generate a sampling reporting packet of the target data based on a current sampling value stored at the network processor and send the sampling reporting packet to the CPU.

8. The method of claim 7, wherein generating the sampling instruction packet at the set frequency according to the sampling parameter comprises:

generating, for a sampling function item whose sampling frequency is not zero in the sampling parameter, a sampling instruction packet at the sampling frequency that is not zero according to the sampling parameter;

wherein the sampling instruction packet carries a packet type, a sampling number, a sampling function item, a reporting count value, and a reporting interval; or the sampling instruction packet carries a packet type, a sampling number, a sampling function item, a reporting count value, a reporting interval, and a redundancy suppression identity;

in a case where the reporting interval comprises a sampling value reporting interval, the reporting count value comprises a sampling value reporting count value; sampling value reporting count values in sampling instruction packets sent sequentially are sequentially increased from an initial value to the sampling value reporting interval, and in a case where a sampling value reporting count value in a sent sampling instruction packet is the sampling value reporting interval, a sampling value reporting count value in a sampling instruction packet sent next is reset to the initial value;

in a case where the reporting interval comprises an average value reporting interval, the reporting count value comprises an average value reporting count value; for sampling function items whose average value reporting interval is not zero, average value reporting count values in sampling instruction packets sent sequentially are sequentially increased from an initial value to the average value reporting interval, and in a case where an average value reporting count value in a sent sampling instruction packet is the average value reporting interval, an average value reporting count value in a sampling instruction packet sent next is reset to the initial value.

9. The method of claim 8, wherein the sampling instruction packet further comprises a total number of sampling function items, and the total number of sampling function items is used for indicating a number of groups of sampling numbers and sampling function items comprised in the sampling instruction packet;

sampling function items in different groups have a same sampling frequency and a same reporting interval.

10. A data sampling method for a network device, applied by a network processor and comprising:

receiving a sampling instruction packet sent by a coprocessor, wherein the sampling instruction packet is generated by the coprocessor at a set frequency according to a sampling parameter of target data sent by a central processing unit (CPU), wherein the CPU is preset with a user configuration parameter and obtains the sampling parameter after processing the user configuration parameter; and generating a sampling reporting packet of the target data based on a current sampling value stored at the network processor according to the sampling instruction packet, and sending the sampling reporting packet to the CPU.

11. The method of claim 10, wherein generating the sampling reporting packet of the target data according to the sampling instruction packet comprises:

updating a locally stored sampling value according to the sampling instruction packet; and in a case where a reporting count value in the sampling instruction packet is equal to a reporting interval, generating the sampling reporting packet of the target data according to the updated locally stored sampling value;

wherein the sampling reporting packet comprises at least one of a sampling value reporting packet and an average value reporting packet.

12. The method of claim 10, wherein generating the sampling reporting packet of the target data according to the sampling instruction packet comprises:

in a case where a redundancy suppression identity in the sampling instruction packet is a valid value, updating a locally stored sampling value according to the sampling instruction packet, and determining whether a sampling value at a current time instant changes;

in response to determining that the sampling value at the current time instant changes, generating the sampling reporting packet of the target data according to the updated locally stored sampling value; and in response to determining that the sampling value at the current time instant does not change, in a case where the reporting count value in the sampling instruction packet is equal to a reporting interval, generating the sampling reporting packet of the target data according to the updated locally stored sampling value;

wherein the sampling reporting packet comprises at least one of a sampling value reporting packet and an average value reporting packet.

13. A coprocessor, comprising:

at least one processor; and a storage medium, which is configured to store at least one program;

wherein the at least one program, when executed by the at least one processor, enables the at least one processor to perform the data sampling method for a network device according to claim 7.

14. A network processor, comprising:

at least one processor; and a storage medium, which is configured to store at least one program;

wherein the at least one program, when executed by the at least one processor, enables the at least one processor to perform the data sampling method for a network device according to claim 10.

15. A network device, comprising:

at least one processor; and a storage medium, which is configured to store at least one program;

wherein the at least one program, when executed by the at least one processor, enables the at least one processor to perform the data sampling method for a network device according to claim 1.

16. The network device of claim 15, wherein the coprocessor comprises an external field-programmable gate array (FPGA) or a packet generator in the network processor.

17. A non-transitory storage medium storing a computer program, wherein the computer program, when executed by a processor, implements the data sampling method for a network device according to claim 1.

18. A non-transitory storage medium storing a computer program, wherein the computer program, when executed by a processor, implements the data sampling method for a network device according to claim 7.

19. A non-transitory storage medium storing a computer program, wherein the computer program, when executed by a processor, implements the data sampling method for a network device according to claim 10.

20. The method of claim 7, wherein the sampling parameter at least comprises: a sampling number, a sampling function item, a sampling frequency, and a reporting interval; or the sampling parameter at least comprises: a sampling number, a sampling function item, a sampling frequency, a reporting interval, and a redundancy suppression identity;

wherein the reporting interval comprises at least one of a sampling value reporting interval or an average value reporting interval, the sampling value reporting interval is determined according to a sampling value reporting frequency and the sampling frequency, and the average value reporting interval is determined according to an average value reporting frequency and the sampling frequency.

* * * * *